United States Patent
Gujral et al.

(10) Patent No.: US 9,980,090 B2
(45) Date of Patent: *May 22, 2018

(54) SYSTEM AND METHOD FOR DETERMINING A SEAT LOCATION OF A MOBILE COMPUTING DEVICE IN A MULTI-SEAT ENVIRONMENT

(71) Applicant: QUALCOMM Incorporated, San Diego, CA (US)

(72) Inventors: Sunvir Gujral, San Diego, CA (US); Paul Jacobs, La Jolla, CA (US); Ravinder Chandhok, Del Mar, CA (US); Liat Ben-Zur, Amsterdam (NL); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 14/943,998

(22) Filed: Nov. 17, 2015

(65) Prior Publication Data

US 2016/0142877 A1 May 19, 2016

Related U.S. Application Data

(60) Provisional application No. 62/081,483, filed on Nov. 18, 2014.

(51) Int. Cl.
*H04W 4/02* (2018.01)
*B60R 16/03* (2006.01)
(Continued)

(52) U.S. Cl.
CPC ........... *H04W 4/023* (2013.01); *B60R 16/037* (2013.01); *E05F 15/77* (2015.01); *H04W 4/005* (2013.01); *H04W 4/046* (2013.01)

(58) Field of Classification Search
CPC ..... H04W 4/023; H04W 4/005; H04W 4/046; H04L 67/306; H04L 67/34; B60R 16/037;
(Continued)

(56) References Cited

U.S. PATENT DOCUMENTS 7,042,333 B2   5/2006   Dix et al.
7,483,964 B1   1/2009   Jackson et al.
(Continued)

FOREIGN PATENT DOCUMENTS

DE   102012211731 A1   5/2014
JP      2000016203 A   1/2000
(Continued)

OTHER PUBLICATIONS

Chu H., et al., "I am a Smartphone and I Know My User is Driving," 6th International Conference on Communication Systems and Networks (COMSNETS), Jan. 2014, pp. 8.
(Continued)

*Primary Examiner* — Ali Neyzari
(74) *Attorney, Agent, or Firm* — Robert A. Reid

(57) ABSTRACT

A system and method for associating a mobile computing device with a particular seat in a seating environment. The system collects first sensor data from device sensors of a first mobile computing device based on activity detected within the seating environment. The system then determines, for each of a plurality of seats in the seating environment, a degree of correlation with the mobile computing device based at least in part on the first sensor data, and associates the mobile computing device with the seat, among the plurality of seats, having the highest degree of correlation with the first mobile computing device.

30 Claims, 22 Drawing Sheets

(51) Int. Cl.
*H04W 4/00* (2018.01)
*B60R 16/037* (2006.01)
*E05F 15/77* (2015.01)
*H04W 4/04* (2009.01)

(58) Field of Classification Search
CPC ...... E05F 15/77; G06F 3/04842; B60N 2/002; G07C 5/008
USPC ...................................... 340/4.61; 701/48, 2
See application file for complete search history.

(56) References Cited

U.S. PATENT DOCUMENTS

| | | | |
|---|---|---|---|
| 8,736,438 | B1 | 5/2014 | Vasquez et al. |
| 8,744,397 | B2 | 6/2014 | Gee et al. |
| 8,868,254 | B2 | 10/2014 | Louboutin |
| 8,880,240 | B2* | 11/2014 | Grimm ................ H04W 4/008 455/41.1 |
| 9,224,289 | B2* | 12/2015 | Demeniuk ............. G08C 17/02 |
| 9,358,940 | B2* | 6/2016 | Cooper ................. B60R 16/037 |
| 9,778,831 | B2* | 10/2017 | Penilla ................ G06F 3/04842 |
| 2005/0017842 | A1 | 1/2005 | Dematteo |
| 2011/0195699 | A1 | 8/2011 | Tadayon et al. |
| 2011/0237186 | A1 | 9/2011 | Preissinger et al. |
| 2012/0086249 | A1 | 4/2012 | Hotary et al. |
| 2012/0208519 | A1 | 8/2012 | Seaver |
| 2012/0326855 | A1 | 12/2012 | Bantz et al. |
| 2013/0024060 | A1 | 1/2013 | Sukkarie et al. |
| 2013/0099892 | A1 | 4/2013 | Tucker et al. |
| 2013/0145065 | A1 | 6/2013 | Ricci |
| 2013/0198802 | A1 | 8/2013 | Ricci |
| 2013/0217331 | A1 | 8/2013 | Manente |
| 2013/0226371 | A1 | 8/2013 | Rovik et al. |
| 2013/0281021 | A1 | 10/2013 | Palin et al. |
| 2014/0142783 | A1 | 5/2014 | Grimm et al. |
| 2014/0163774 | A1 | 6/2014 | Demeniuk |
| 2014/0297220 | A1 | 10/2014 | Raffa et al. |
| 2014/0306814 | A1 | 10/2014 | Ricci |
| 2014/0309893 | A1 | 10/2014 | Ricci |
| 2015/0088337 | A1 | 3/2015 | Toohy et al. |
| 2015/0148989 | A1 | 5/2015 | Cooper et al. |
| 2015/0149042 | A1 | 5/2015 | Cooper et al. |
| 2015/0210287 | A1 | 7/2015 | Penilla et al. |

FOREIGN PATENT DOCUMENTS

| | | |
|---|---|---|
| JP | 2006027439 A | 2/2006 |
| JP | 2010213185 A | 9/2010 |
| JP | 2011101118 A | 5/2011 |
| KR | 101031490 B1 | 4/2011 |

OTHER PUBLICATIONS

Continental: "Two Decades of Remote Access Key Expertise," Nov. 15, 2013, 2 pages.
He Z., et al., "Who Sits Where? Infrastructure-Free In-Vehicle Cooperative Positioning via Smartphones," Sensors, 2014, vol. 14, pp. 11605-11628.
"Human Factors (HF); Intelligent Transport Systems (ITS); ICT in cars", Technical Report, European Telecommunications Standards Institute (ETSI), 650, Route Des Lucioles ; F-06921 Sophia-Antipolis ; France, vol. HF, No. V1.1.1, Apr. 1, 2010 (Apr. 1, 2010), XP014046275, pp. 24-34,60.
OnStar, LLC Productivity, "OnStar Remote Link," Jul. 7, 2014, 2 pages.
Patently Apple: "Apple Reveals Advanced Automotive Access & Control System," Apr. 25, 2013, [Retrieved date on Sep. 25, 2014], Retrieved from the Internet URL: http://www.patentlyapple.com/patently-apple/2013/04/apple-reveals-advanced-automotive-access-control-system.html >, 9 pages.
International Search Report and Written Opinion—PCT/US2015/061355—ISA/EPO—dated Mar. 3, 2016.

* cited by examiner

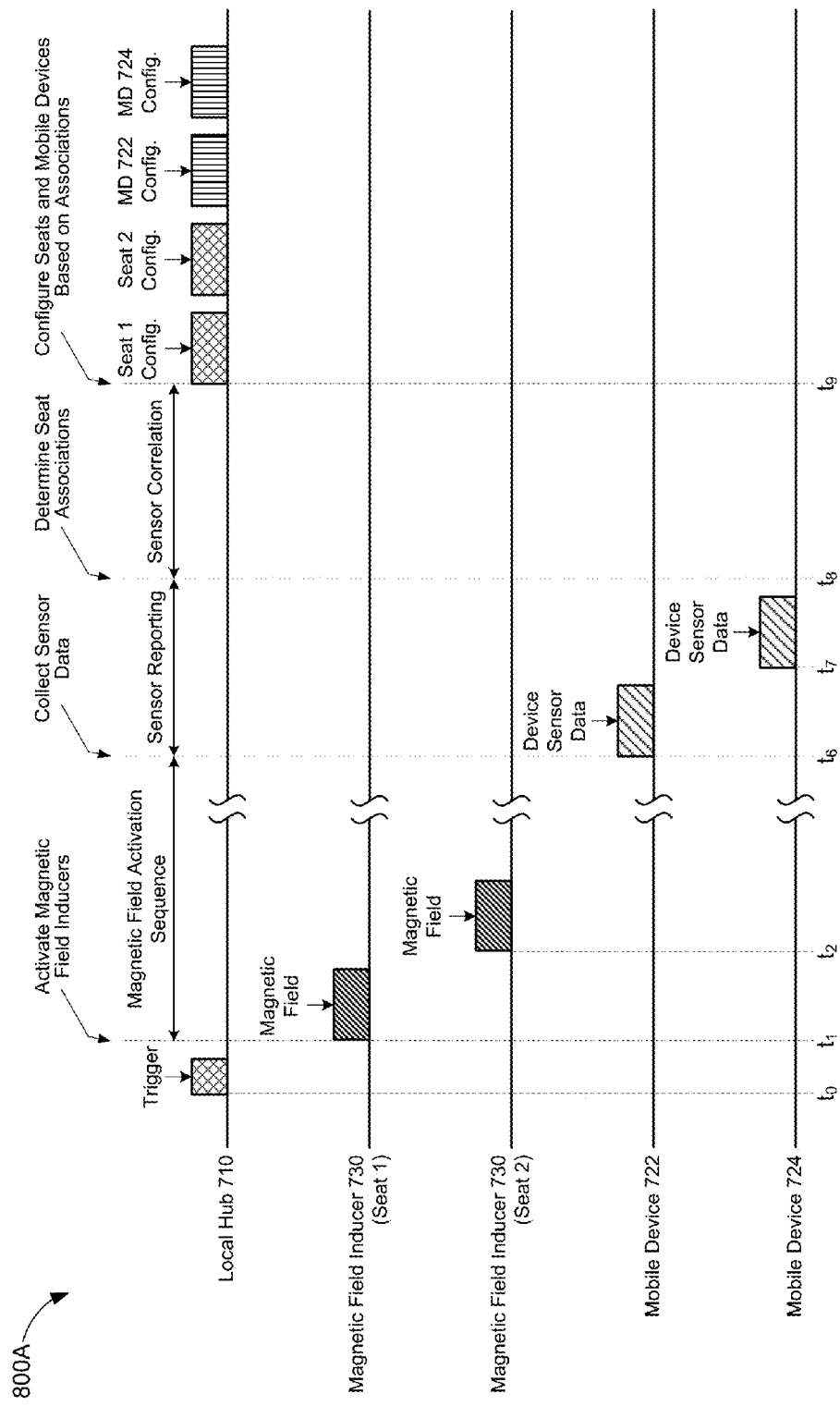

SYSTEM AND METHOD FOR DETERMINING A SEAT LOCATION OF A MOBILE COMPUTING DEVICE IN A MULTI-SEAT ENVIRONMENT

CROSS-REFERENCE TO RELATED APPLICATION

This claims priority to and commonly-owned U.S. Provisional Patent Application No. 62/081,483, titled "SYSTEM AND METHOD FOR DETERMINING A SEAT LOCATION OF A MOBILE COMPUTING DEVICE IN A MULTI-SEAT ENVIRONMENT," filed Nov. 18, 2014, which is hereby incorporated by reference in its entirety.

TECHNICAL FIELD

Various embodiments described herein generally relate to a system and method for determining a seat location of a mobile computing device in a multi-seat environment.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

As such, in the near future, increasing development in IoT technologies will lead to numerous IoT devices surrounding a user at home, in vehicles, at work, and many other locations. However, despite the fact that IoT capable devices can provide information about the general location of themselves, known conventional location methods have low precision and are unsuited to circumstances where the difference of feet or inches is important. For example, GPS and acoustic position determination methods may not be accurate enough to determine in which seat inside a vehicle a device is located, especially while the vehicle is in motion.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter Examples described herein include a system and method for associating a mobile computing device with a particular seat in a seating environment. The system collects first sensor data from device sensors of a first mobile computing device based on activity detected within the seating environment. The system then determines, for each of a plurality of seats in the seating environment, a degree of correlation with the first mobile computing device based at least in part on the first sensor data, and associates the first mobile computing device with the seat, among the plurality of seats, having the highest degree of correlation with the first mobile computing device.

In some aspects, the system may receive second sensor data from each of a plurality of seat sensors. The system may further compare, for each of the plurality of seats, the first sensor data with the second sensor data received from a corresponding one of the plurality of seat sensors. For example, the first sensor data may include accelerometer data based on a movement of the first mobile computing device, and the second sensor data may include accelerometer data based on a movement of a corresponding one of the plurality of seats. Accordingly, the system may determine a similarity between respective movements of the first mobile computing device and each of the plurality of seats.

In other aspects, the first sensor data may include magnetometer data based on a magnetic field in the seating environment. For example, the magnetometer data may indicate at least a direction and strength of the magnetic field at a location of the first mobile computing device. The system may determine a relative proximity of the first mobile computing device to a source of the magnetic field based at least in part on the magnetometer data. Further, the system may identify a location of the source relative to each of the plurality of seats, and determine a closeness of the first mobile computing device to each of the plurality of seats based at least in part on the location of the source and the relative proximity of the first mobile computing device to the source.

Still further, in some aspects, the system may collect third sensor data from device sensors of a second mobile computing device in the seating environment. Moreover, the system may compare the third sensor data with the first sensor data to determine the degree of correlation.

BRIEF DESCRIPTION OF THE DRAWINGS

The example embodiments are illustrated by way of example and are not intended to be limited by the figures of the accompanying drawings. Like numbers reference like elements throughout the drawings and specification.

FIG. 8A shows an example timing diagram depicting an operation for determining a seat location of a mobile computing device using magnetic field inducers in a centralized seat association system.

DETAILED DESCRIPTION

Figure 1A:
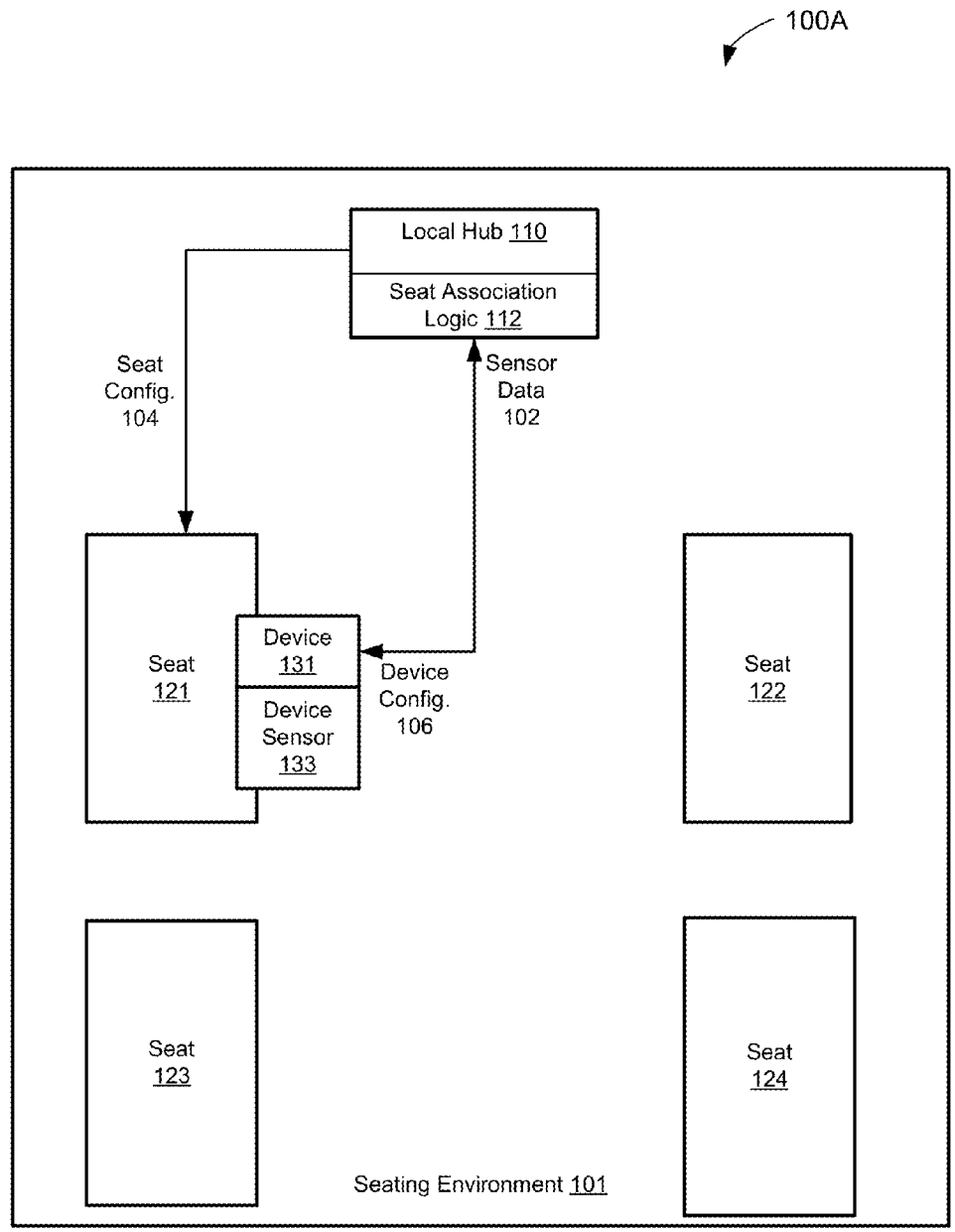
FIG. 1A shows a block diagram of a system for associating a mobile computing device with a particular seat in a seating environment, in accordance with example implementations.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

As used herein, a "seat location" in the context of a mobile computing device is intended to mean the likely seat location of a user of the mobile computing device. For example, a user may hold a mobile computing device in his or her hand or have a mobile computing device on his or her body while occupying a particular seat, or the user may place their mobile computing device on an adjacent console. Thus, while reference may be made to a "seat location" for a mobile computing device, in many examples, the mobile computing device may be held slightly off-seat and/or positioned in the hands or belongings of a user.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Sensor Correlation Overview

FIG. 1A shows a block diagram of a system 100A for associating a mobile computing device with a particular seat in a seating environment, in accordance with example implementations. The system 100A includes a local hub 110 provided within a seating environment 101 that includes multiple seats 121-124. For example, the seating environment 101 may correspond to a vehicle, such as an automobile, bus, passenger van, train, airplane, rollercoaster, etc. In some variations, the seating environment 101 may be a static environment, such as a restaurant, theater, office, room, etc.

In some implementations, it may be desirable for the vehicle or operator of the seating environment 101 to know which of the seats 121-124 are occupied. Further, it may be desirable to identify the particular user occupying each of the seats 121-124. For example, an automobile may programmatically adjust one or more seat settings and/or configurations to suit the preferences of a known user. In some examples, the automobile may also control certain functions of a user's mobile computing device (e.g., disabling text messages and/or phone calls) based on the particular seat in which that user is seated (e.g., the driver's seat). Similarly, by associating users with particular seats in an airplane seating environment, individual passengers may locate one another on a seating map and/or interact with one another (e.g., using seat-to-seat communications).

In the example of FIG. 1A, a user and/or operator of a mobile computing device 131 enters the seating environment 101 and sits down in seat 121. The mobile computing device 131 may be, for example, a cell phone, personal digital assistant (PDA), tablet device, laptop computer, or any other device that is capable of wireless communications (e.g., with the local hub 110). In some implementations, the mobile computing device 131 may be configured for communications governed by the IEEE 802.11 family of standards, BLUETOOTH® (Bluetooth), HiperLAN (a set of wireless standards, comparable to the IEEE 802.11 standards, used primarily in Europe), and/or other technologies having relatively short radio propagation range.

The mobile computing device 131 includes one or more sensors 133 (e.g., accelerometer, gyroscope, magnetometer, etc.) that may be used to detect activity by the mobile computing device 131 and/or in the surrounding environment (e.g., seating environment 101). For example, modern mobile phones are provided with accelerometers that may be used to detect an acceleration and/or movement of a phone (e.g., to display content in either a "portrait" or a "landscape" mode). Many mobile phones are also provided with magnetometers that may be used to detect magnetic fields in the environment surrounding a phone (e.g., to indicate a direction and/or bearing of the phone in a virtual compass application).

In some aspects, the mobile computing device 131 may communicate wirelessly with the local hub 110. For example, the mobile computing device 131 may establish wireless communications with the local hub 110 upon entering the seating environment 101. More specifically, the mobile computing device 131 may transmit sensor data 102, collected from the device sensor 133, to the local hub 110. The sensor data 102 may include, for example, accelerometer data indicating a direction and/or magnitude of acceleration of the mobile computing device 131, magnetometer data indicating a direction and/or magnitude of a magnetic field in the seating environment 101, and/or data from any other sensors provided with the mobile computing device 131.

In example implementations, the local hub 110 may associate the mobile computing device 131 with a particular one of the seats 121, 122, 123, or 124 based at least in part on the sensor data 102 provided by the mobile computing device 131. For example, the local hub 110 may include seat association logic 112 to determine a degree of correlation of the mobile computing device 131 to each of the seats 121-124 using the sensor data 102. In some aspects, the seat association logic 112 may determine the degree of correlation based on accelerometer data of the mobile computing device 131 (e.g., as described in greater detail below with respect to FIGS. 1B-1D). In other aspects, the seat association logic 112 may determine the degree of correlation based on magnetometer data of the mobile computing device 131 (e.g., as described in greater detail below with respect to FIGS. 1E-1G). The seat association logic 112 may then associate the mobile computing device 131 to the seat (e.g., seat 121) with the highest degree of correlation among the seats 121-124 in the seating environment 101.

Upon associating the mobile computing device 131 with seat 121, the local hub 110 may then transmit configuration data 104 and 106 to the seat 121 and mobile computing device 131, respectively. For example, the seat configuration data 104 may control one or more settings for the particular seat 121 (e.g., seat position, angle of recline, temperature, etc.) and/or the associated seating environment (e.g., climate control, media output, window locks, etc.) based on the associated mobile computing device 131. The device configuration data 106 may control one or more settings for the mobile computing device 131 (e.g., enabling/disabling text messages and/or phone calls, activating a mapping application, initiating a Bluetooth pairing operation, etc.) based on the associated seat 121.

In some aspects, the seat association logic 112 may adjust the configurations 104 and/or 106 in an on-demand fashion. For example, the occupancy of the seating environment 101 may change after a preliminary determination is made for each of the seats 121-124 (e.g., a passenger may shift from one seat to another). In such a scenario, the seat association logic 112 may be triggered to identify the new location of the passenger. For example, the seat association logic 112 may periodically collect sensor data from sensors and/or devices within the seating environment 101. When triggered, the seat association logic 112 may re-determine the seat associations for each of the seats 121-124 so as to enable automatic or seamless changes to the seat configurations 104 and/or device configurations 106 based on the new seat associations.

The examples herein recognize that the location of a mobile computing device may be more precisely determined by collecting a greater volume of sensor data from sensors located closer to the mobile device. In contrast, existing systems and techniques for locating or determining the position of a mobile computing device (e.g., GPS, acoustic positioning, etc.) are typically not precise enough (e.g., do not provide sufficient granularity) to pinpoint the exact seat in which a particular device is located, especially when there are a number of seats in relatively close proximity to each other. Thus, the systems and methods disclosed herein may be better suited for associating a mobile computing device with a particular seat in a seating environment. Moreover, by leveraging existing sensors (e.g., accelerometers, gyroscopes, magnetometers, etc.) of a mobile computing device, the example systems and methods may be implemented with little (e.g., minimal) modifications to the mobile computing device and/or seating environment.

Figure 1B:
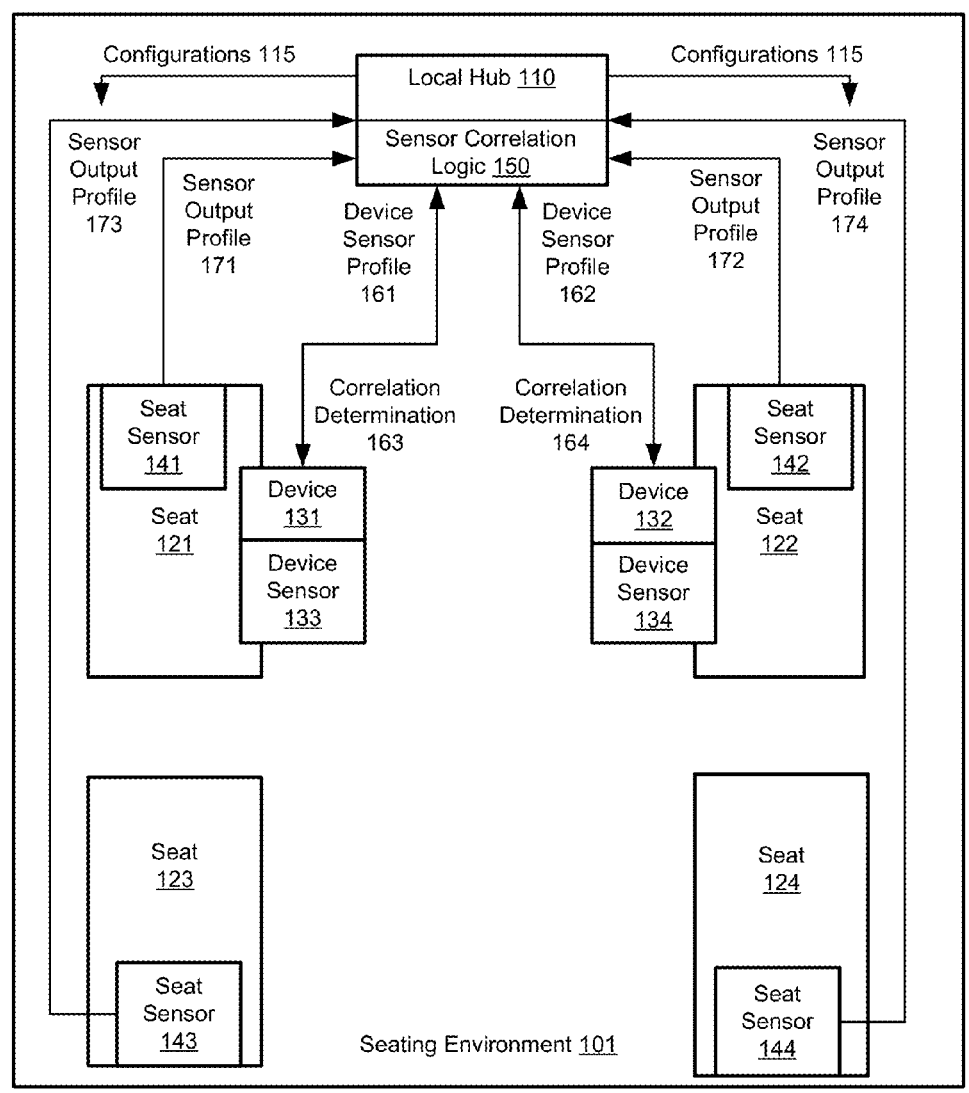
FIG. 1B shows a system for determining seat locations of mobile computing devices based on sensor correlation determinations made by a local hub as between sensors of mobile computing devices within the seating environment and sensors provided with seats of the seating environment, in accordance with example implementations.

FIG. 1B shows a system 100B for determining a seat location of a mobile computing device based on sensor correlation determinations made by a local hub as between sensors of mobile computing devices within the seating environment and sensors provided with seats of the seating environment, in accordance with example implementations. In the example of FIG. 1B, a second mobile computing device 132 is brought within the seating environment 101. Further, the system 100B includes a number of seat sensors 141-144 that are provided on, or otherwise paired with, seats 121-124, respectively. For example, each of the seat sensors 141-144 may correspond to at least one of an accelerometer, a gyroscope, and/or any other type of sensor capable of generating sensor data that may be correlated with sensor data from a mobile computing device.

In the example of FIG. 1B, each of the seats 121-124 includes only one seat sensor. However, in other implementations, the seating environment 101 may contain any number of seats, each having any number of sensors. In some aspects, all of the seats 121-124 have the same number of seat sensors. In other aspects, some of the seats 121, 122, 123, and/or 124 may have a different number of seat sensors than the other seats. The devices and components of FIG. 1B may each include resources to enable wireless communications with one another. For example, to facilitate communication and interoperability among the sensors and/or devices, the mobile computing devices 131-132, seat sensors 141-144, and/or local hub 110 may share a common computing or communication platform, such as provided through ALLJOYN, as hosted by ALLSEEN ALLIANCE.

In example implementations, the local hub 110 may include sensor correlation logic 150 (e.g., which may be a particular implementation of seat association logic 112) to determine a correlation between sensor data from the mobile computing devices 131-132 and the seats 121-124. More specifically, the sensor correlation logic 150 may associate each of the mobile computing devices 131 and 132 with a respective one of the seats 121-124 (e.g., when the mobile computing devices 131-132 are carried or otherwise brought into the seating environment 101). The local hub 110, executing sensor correlation logic 150, obtains a first set of sensor data, in the form of sensor output profiles 171-174, from the seat sensors 141-144, respectively, and compares the sensor output profiles 171-174 with a second set of sensor data, in the form of device sensor profiles 161 and 162, from the mobile computing devices 131 and 132, respectively. This comparison may be used to determine a degree of correlation between respective sensor profiles of the mobile computing devices 131-132 and each of the seat sensors 141-144. More specifically, the sensor output profile 171-174 with the strongest degree of correlation to a particular device sensor profile 161 or 162 may be indicative of the most likely seat location for the corresponding mobile computing device.

For example, the sensor output profiles 171-174 may include accelerometer data corresponding to events such as a user sitting in one of the seats 121-124, in which case the center of mass of the corresponding seat may accelerate vertically. The sensor output profiles 171-174 may also include accelerometer data corresponding to events such as the seating environment 101 (e.g., which may correspond to a vehicle) moving, in which case the center of mass of the corresponding seat may accelerate laterally and/or longitudinally due to the motion of the vehicle.

In a similar fashion, the device sensor profiles 161 and 162 may be generated by device sensors 133 and 134, respectively, on the mobile computing devices 131 and 132, and may include accelerometer data collected from motion sensors such as accelerometers and/or gyroscopes. The mobile computing devices 131-132 may, for example, record acceleration events of the seating environment 101 and/or the seats 121-124 (e.g., corresponding to the user sitting in one of the seats 121-124, or a vehicle of the seating environment 101 being moved about). The sensor correlation logic 150 may correlate the sensor output profiles 171-174 with the device sensor profiles 161-162 in order to determine a relative location of (e.g., seat associated with) the respective mobile computing devices 131-132.

For example, the sensor correlation logic 150 may determine that the device sensor profile 161, received from device sensor 133, is most closely correlated with the sensor output profile 171, received from seat sensor 141. Based on this correlation, the sensor correlation logic 150 may associate mobile computing device 131 with seat 121. The sensor correlation logic 150 may also determine that the device sensor profile 162, received from device sensor 134, is most closely correlated with the sensor output profile 172, received from seat sensor 142. Based on this correlation, the sensor correlation logic 150 may associate mobile computing device 132 with seat 122.

Any one of multiple possible actions can be triggered or performed by the local hub 110 upon determining the seats 121, 122, 123, or 124 associated with the mobile computing devices 131-132. As described above, the actions may result in the implementation of configurations 115 of various aspects of the seating environment 101 (e.g., including the seats 121-124) based on the determined seat associations. By way of example, the local hub 110 may adjust one or more user-configured and/or vehicle-specific settings in regions of the seating environment 101 (e.g., temperature, seat configuration, media output on proximate media output device, etc.).

As an addition or alternative, the seat associations for the mobile computing devices 131-132 may also be communicated back to the devices 131-132 as correlation determinations 163-164, respectively. The mobile computing devices 131-132 may further implement settings or other configurations based on the respective correlation determinations 163-164. For example, where seat 121 is a driver's seat, the mobile computing device 131 may be prevented from sending and/or composing text messages, whereas the mobile computing device 132 may have full messaging functionality. In another example, a mobile computing device located at the rear of a vehicle may be permitted to control a backseat entertainment console (e.g., associated with seats 123 and/or 124), but not a front-seat console (e.g., associated with seats 121 and/or 122).

Figure 1C:
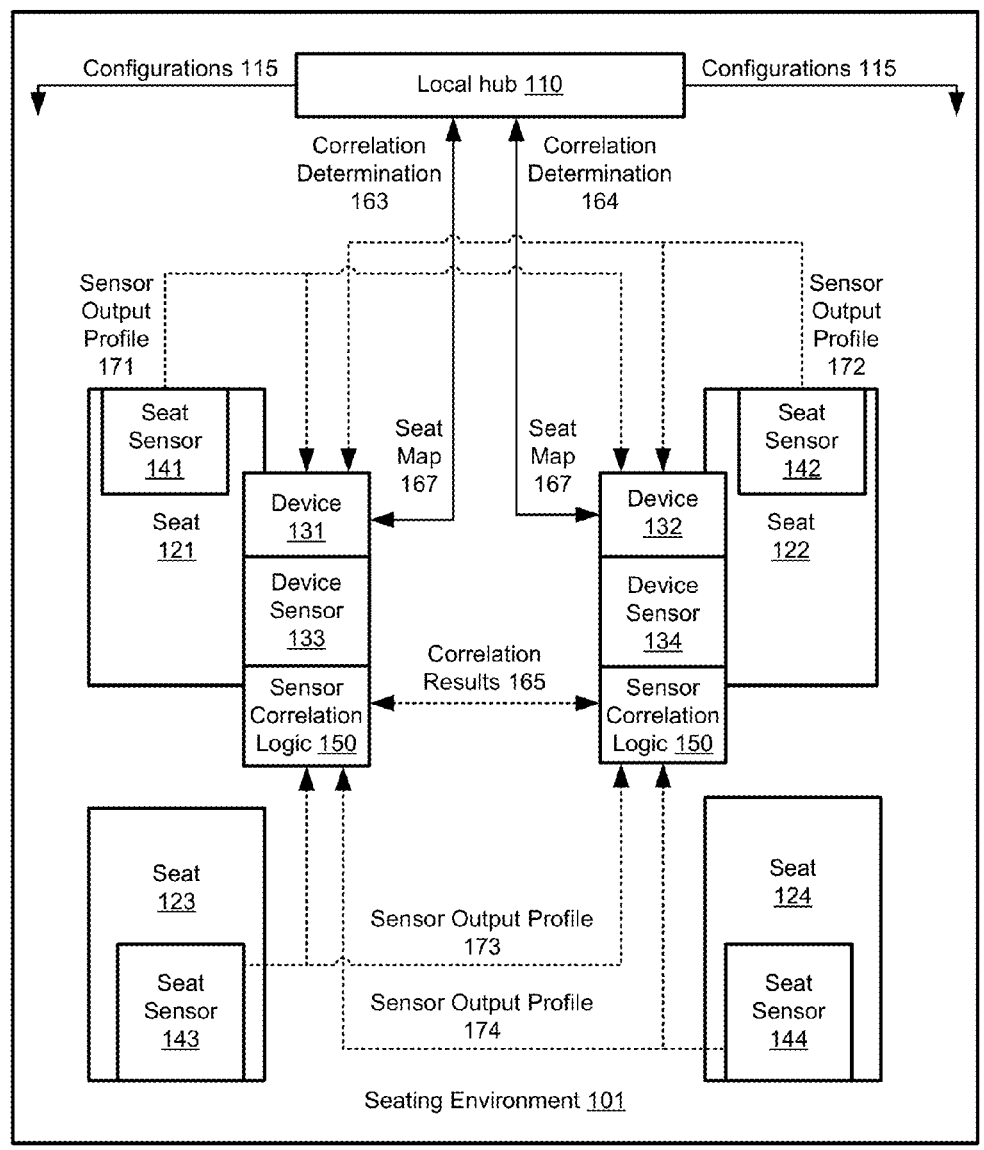
FIG. 1C shows a variation of the system of FIG. 1B in which sensor correlation logic is distributed amongst multiple mobile computing devices as part of a system for determining seat positions of the mobile computing devices within the seating environment.

FIG. 1C shows a variation of the system of FIG. 1B in which the sensor correlation logic 150 is distributed amongst multiple mobile computing devices, for example, as part of a system 100C for determining seat positions of the mobile computing devices 131 and 132 within the seating environment 101. In the example of FIG. 1C, the individual mobile computing devices 131-132 (e.g., instead of the local hub 110) may implement the sensor correlation logic 150 to determine their respective seat associations. More specifically, in some implementations, the mobile computing devices 131-132 may exchange data with one another to determine their respective seat associations.

In the example of FIG. 1C, each of the seat sensors 141-144 may send respective sensor output profiles 171-174 to each of the mobile computing devices 131-132. The sensor correlation logic 150 provided with each of the mobile computing devices 131 and 132 may then correlate the received sensor output profiles 171-174 with sensor data collected from the corresponding device sensor 133 or 134 to determine the seat most closely associated with that mobile computing device (e.g., as described above with respect to FIG. 1B). In some aspects, one or both of the mobile computing devices 131-132 may be pre-configured with a seat map 167 (e.g., which may alternatively be acquired from an external source such as, for example, the local hub 110). The seat map 167 enables the sensor output profiles 171-174 to be identified with a particular seat, for example, by indicating the pairing of seat sensors 141-144 to seats 121-124.

In some aspects, the mobile computing devices 131-132 may exchange correlation results 165 with one another. For example, the correlation results 165 may indicate the degrees of correlation of the corresponding mobile computing device 131 or 132 to each of the seats 121-124 in the seating environment 101. In one aspect, each of the mobile computing devices 131-132 may determine a degree of confidence of its own seat association determination based on the correlation results 165 received from another other mobile computing device.

For example, the correlation results 165 from mobile computing device 131 may indicate that it is 90% likely to be in seat 121 and 10% likely to be in seat 122. In the same example, the correlation results 165 from mobile computing device 132 may indicate that it is 60% likely to be in seat 121 and 40% likely to be in seat 122. Since mobile computing device 131 is significantly more "confident" than mobile computing device 132 in its determination that it should be associated with seat 121 (e.g., 90%>60%), mobile computing device 132 may defer to the correlation results 165 of mobile computing device 131 with respect to seat 121. Based on the comparison, mobile computing device 132 may determine that it is in fact associated with seat 122 (e.g., the seat having the second highest correlation with mobile computing device 132).

After comparing correlation results 165, the mobile computing devices 131 and 132 may send their respective correlation determinations 163 and 164 to the local hub 110. The local hub 110 may then use the correlation determinations 163 and 164 to determine the set of configurations 115 (e.g., individual user preferences of seat settings, media output device settings, temperature settings, etc.) for the seating environment 101 and/or mobile computing devices 131 and 132.

Figure 1D:
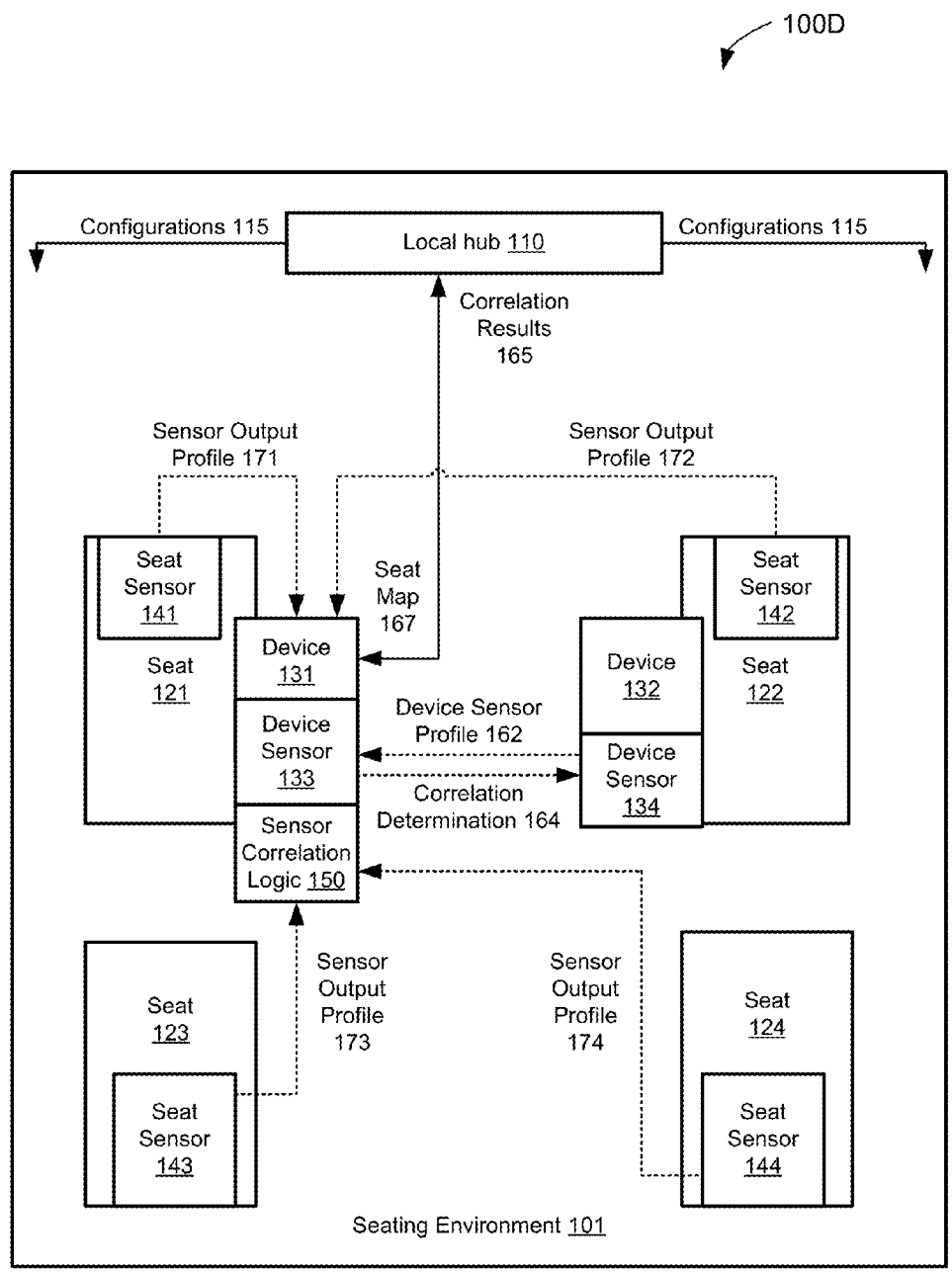
FIG. 1D shows a variation of the system of FIG. 1B in which sensor correlation logic is provided with one of multiple mobile computing devices to determine a seat position of each mobile computing device within the seating environment.

FIG. 1D shows a variation of the system of FIG. 1B in which the sensor correlation logic 150 is provided with one of multiple mobile computing devices to determine a seat position of each of the mobile computing devices 131 and 132 within the seating environment 101. In the example of FIG. 1D, a distributed system 100D is provided in which the mobile computing device 131 includes sensor correlation logic 150 to determine the seat positions of each mobile computing device in the seating environment 101. For example, mobile computing device 131 may act as a "master" device (e.g., upon entering the seating environment 101 and/or connecting with the local hub 110) for purposes of determining seat positions of each mobile computing device located within the seating environment 101. Thus, the sensor correlation logic 150, as executed on the master device 131, may operate in substantially the same manner as described above, with respect to FIGS. 1B and 1C.

The master device 131 may receive a seat map 167 from, for example, the local hub 110. Alternatively, the master device 131 may be preconfigured with the seat map 167. Each of the seat sensors 141-144 may send respective sensor output profiles 171-174 to the master device 131. Furthermore, the master device 131 may receive a set of sensor data, as device sensor profile 162, from the device sensor 134 of mobile computing device 132. The sensor correlation logic 150 provided with the master device 131 then correlates the received sensor output profiles 171-174 with sensor data collected from its own device sensor 133, as well as the device sensor profile 162 received from mobile computing device 132, to determine the respective seats most closely associated with each of the mobile computing devices 131 and 132.

Upon determining the seat associations, the master device 131 may send the correlation results 165 to the local hub 110. The local hub 110 may then use the correlation results 165 to determine the set of configurations 115 (e.g., individual user preferences of seat settings, media output device settings, temperature settings, etc.) for the seating environment 101 and/or mobile computing devices 131 and 132. In some aspects, the master device 131 may also send the appropriate correlation determination 164 (e.g., indicating the seat most closely associated with mobile computing device 132) to the mobile computing device 132.

Magnetic Field Generation Overview

Figure 1E:
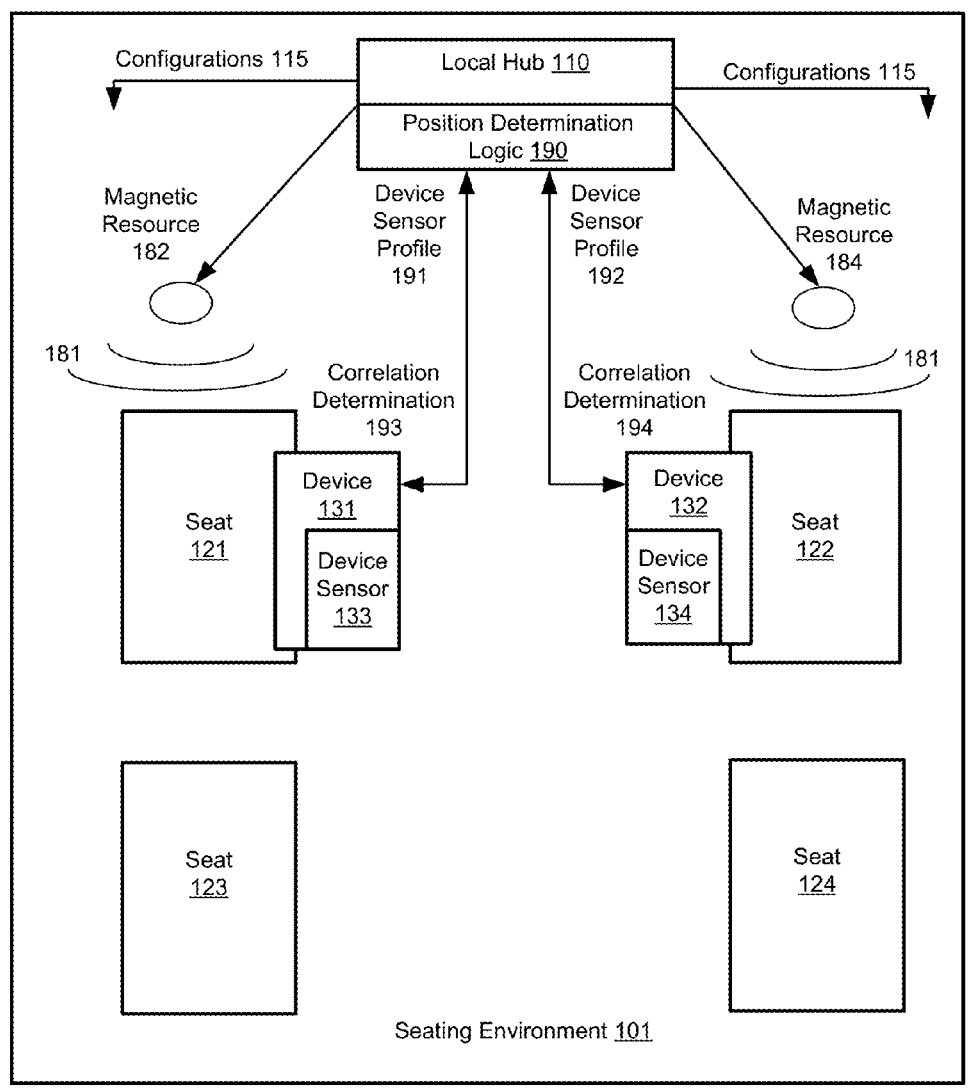
FIG. 1E shows a system for determining a seat location of a mobile computing device based on magnetic fields and position determination logic provided with a local hub, in accordance with example implementations.

FIG. 1E shows a system 100E for determining a seat location of a mobile computing device based on magnetic fields and position determination logic provided with a local hub, in accordance with example implementations. The system 100E includes one or more magnetic resources 182-184 capable of generating or otherwise producing magnetic fields 181 within the seating environment 101. In some aspects, the magnetic resources 182-184 may include permanent magnets that produce constant (e.g., static) magnetic fields 181. In other aspects, the magnetic resources 182-184 may include electromagnets that can induce time-varying magnetic fields 181.

In the example of FIG. 1E, the device sensors 133-134 may generate respective device sensor profiles 191-192 upon sensing or detecting the magnetic fields 181 propagating through the seating environment 101. For example, the device sensor profiles 191 and 192 may include magnetometer data (e.g., collected from a magnetometer) indicating a direction and/or strength of the magnetic fields 181 at the location of the corresponding mobile computing device, over a given duration. In one implementation, the magnetic fields 181 may be switched on and off (e.g., in a particular sequence) based on the locations of the magnetic resources 182-184 (e.g., as described in greater detail below).

The local hub 110 receives the device sensor profiles 191 and 192 and determines a seat association from each of the mobile computing devices 131 and 132 based at least in part on the device sensor profiles 191 and 192. In some aspects, the local hub 110 may include position determination logic 190 (e.g., which may be a particular implementation of seat association logic 112) to determine a relative position of each of the mobile computing devices 131 and 132 within the seating environment 101. For example, the position determination logic 190 may determine a relative proximity of each mobile computing device 131 and 132 to each of the magnetic resources 182 and 184 based on the strength and/or direction of the magnetic fields 181 detected by that mobile computing device. Then, based on known locations of the magnetic resources 182-184 (e.g., in relation to the seats 121-124) within the seating environment 101, the position determination logic 190 may determine which of the seats 121-124 is closest in proximity to each of the mobile computing devices 131-132. For example, the position determination logic 190 may correlate the relative proximities of the mobile computing devices 131 and 132 to the magnetic resources 182-184 with known distances between the magnetic resources 182-184 and each of the seats 121-124 in the seating environment. Accordingly, each of the mobile computing devices 131-132 may be associated to the seat with the highest degree of correlation.

For example, the position determination logic 190 may determine, based on the device sensor profile 191, that mobile computing device 131 is just south (e.g., within a threshold distance) of magnetic resource 182 and south-west of magnetic resource 184. Based on the relative proximities of mobile computing device 131 to each of the magnetic resources 182 and 184 the position determination logic 190 may determine that the mobile computing device 131 is closer to seat 121 than any of the remaining seats 122-124, and may thus associate mobile computing device 131 with seat 121. Similarly, the position determination logic 190 may determine, based on the device sensor profile 192, that mobile computing device 132 is just south (e.g., with a threshold distance) of magnetic resource 184 and south-east of magnetic resource 182. Based on the relative proximities of mobile computing device 132 to each of the magnetic resources 182 and 184, the position determination logic 190 may determine that the mobile computing device 132 is closer to seat 122 than any of the remaining seats 121, 123, or 124, and may thus associate mobile computing device 132 with seat 122.

As described above, with respect to FIGS. 1B-1D, the local hub 110 may use the seat associations to determine the set of configurations 115 (e.g., individual user preferences of seat settings, media output device settings, temperature settings, etc.) for the seating environment 101 and/or mobile computing devices 131 and 132. In some aspects, the local hub 110 may send respective correlation determinations 193 and 194 to each of the mobile computing devices 131 and 132 to indicate the seat associations.

Although two magnetic resources 182 and 184 are shown in the example of FIG. 1E, in other implementations, the seating environment 101 may include fewer or more magnetic resources than those shown. For example, in some aspects, the position determination logic 190 may determine the relative locations of the mobile computing devices 131 and 132 within the seating environment 101 based on their respective proximities to a single magnetic resource 182 or 184. In other aspects, a separate magnetic resource may be provided with each of the seats 121-124. For example, by comparing the relative direction and strength of magnetic fields from each of the seats 121-124, as detected by the mobile computing devices 131-132, the position determination logic 190 may determine, with greater precision, the seat most closely correlated with each mobile computing device 131 and 132.

Figure 1F:
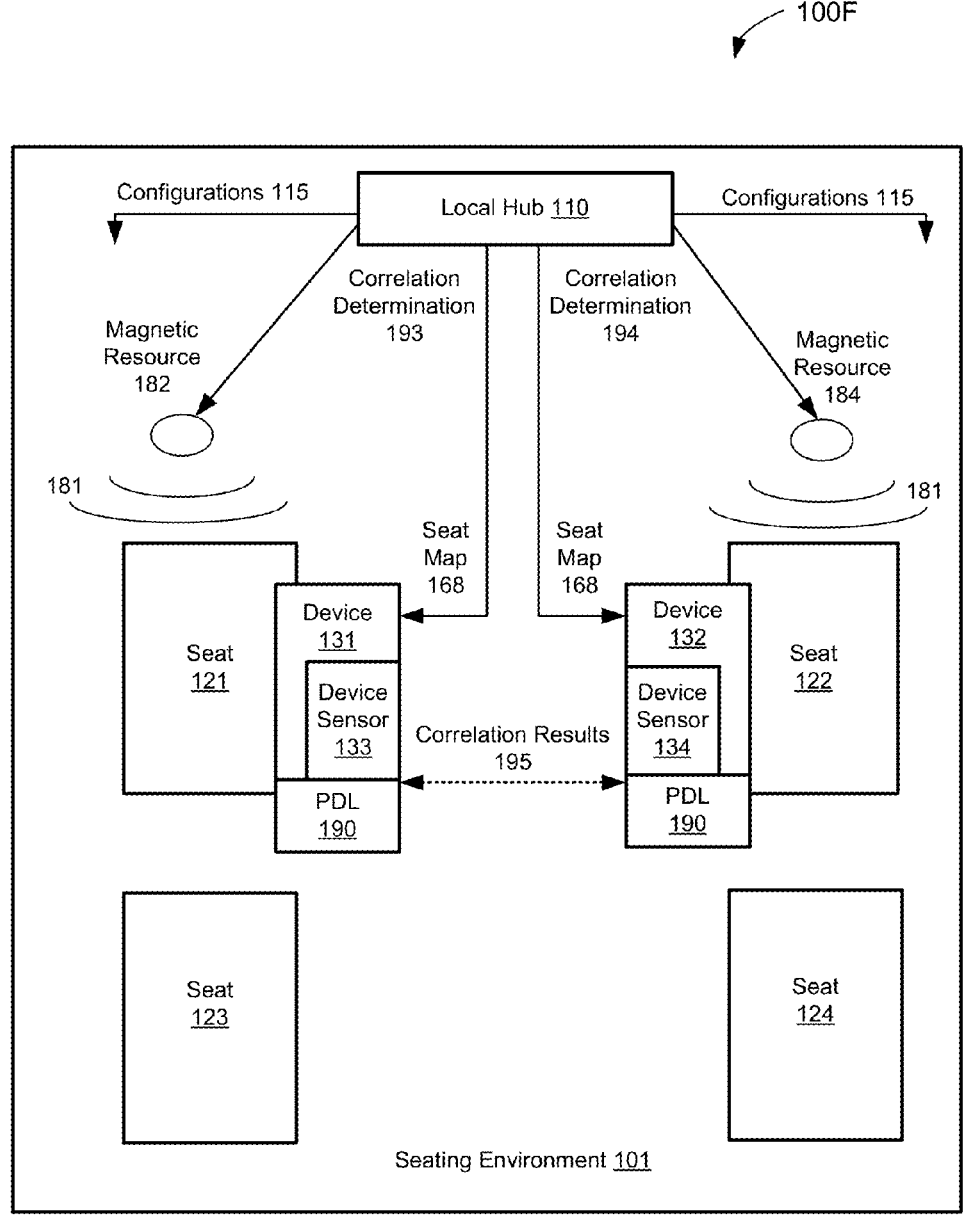
FIG. 1F shows a variation of the system of FIG. 1E in which position determination logic is distributed among multiple mobile computing devices as part of a system for determining seat positions of the mobile computing devices within the seating environment.

FIG. 1F shows a variation of the system depicted in FIG. 1E, for example, in which the position determination logic 190 is distributed among multiple mobile computing devices as part of a system 100F for determining seat positions of the mobile computing devices 131-132 within the seating environment 101. In the example of FIG. 1F, the individual mobile computing devices 131-132 (e.g., instead of the local hub 110) may implement the position determination logic (PDL) 190 to determine their respect seat associations. More specifically, in some implementations, the mobile computing devices 131-132 may exchange data with one another to determine their respective seat associations.

In the example of FIG. 1F, the position determination logic 190 provided with each of the mobile computing devices 131 and 132 may correlate magnetometer data collected by respective device sensors 133 and 134 with relative locations of the magnetic resources 182 and 184 within the seating environment to determine the seat most closely associated with that mobile computing device (e.g., as described above with respect to FIG. 1E). In some aspects, one or both of the mobile computing devices 131-132 may be pre-configured with a seat map 168 (e.g., which may alternatively be acquired from an external source such as, for example, the local hub 110). The seat map 168 enables the magnetic fields 181 to be correlated with a particular seat, for example, by indicating the relative locations of the magnetic resources 182 and 184 and/or seats 121-124 within the seating environment 101.

In some aspects, the mobile computing devices 131-132 may exchange correlation results 195 with one another. For example, the correlation results 195 may indicate the degrees of correlation of the corresponding mobile device 131 or 132 to each of the seats 121-124 in the seating environment 101. As described above, with respect to FIG. 10, each of the mobile computing devices 131-132 may determine a degree of confidence of its own seat association determination based on the correlation results 195 received from another mobile computing device.

After comparing correlation results 195, the mobile computing devices 131 and 132 may send their respective correlation determinations 193 and 194 to the local hub 110. The local hub 110 may then use the correlation determinations 193 and 194 to determine the set of configurations 115 (e.g., individual user preferences of seat settings, media output device settings, temperature settings, etc.) for the seating environment 101 and/or mobile computing devices 131 and 132.

Figure 1G:
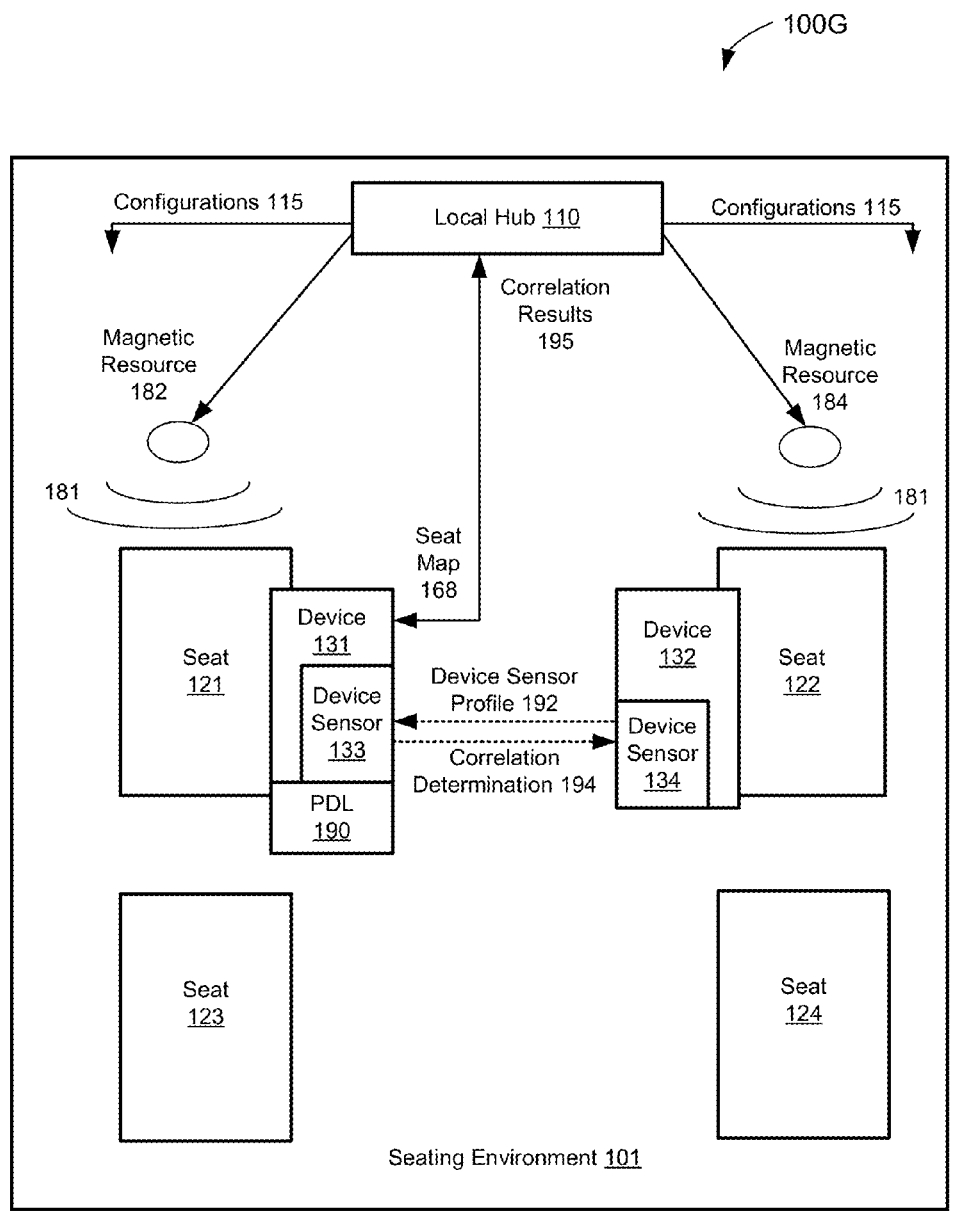
FIG. 1G shows a variation of the system of FIG. 1E in which position determination logic is provided with one of multiple mobile computing devices to determine a seat position of each of the mobile computing devices within the seating environment.

FIG. 1G shows a variation of the system of FIG. 1E in which the position determination logic 190 is provided with one of multiple mobile computing devices to determine a seat position of each of the mobile computing devices 131-132 within the seating environment 101. In the example of FIG. 1G, a distributed system 100G is provided in which the mobile computing device 131 (e.g., the master device) includes position determination logic (PDL) 190 to determine the seat positions of each mobile computing device in the seating environment 101. Thus, the position determination logic 190, as executed on the master device 131, may operate in substantially the same manner as described above, with respect to FIGS. 1E and 1F.

The master device 131 may receive a seat map 168 from, for example, the local hub 110. Alternatively, the master device 131 may be preconfigured with the seat map 168. The master device 131 may receive a set of sensor data, as device sensor profile 192, from the device sensor 134 of mobile computing device 132. The position determination logic 190 may then correlate magnetometer data collected by the device sensors 133 with the relative locations of the magnetic resources 182 and 184 within the seating environment, as well as the device sensor profile 192 received form mobile computing device 132, to determine the seat most closely associated with each of the mobile computing devices 131 and 132.

Upon determining the seat associations, the master device 131 may send the correlation results 195 to the local hub 110. The local hub 110 may then use the correlation results 195 to determine the set of configurations 115 (e.g., individual user preferences of seat settings, media output device settings, temperature settings, etc.) for the seating environment 101 and/or mobile computing devices 131 and 132. In some aspects, the master device 131 may also send the appropriate correlation determination 194 (e.g., indicating the seat most closely associated with mobile computing device 132) to the mobile computing device 132.

While the seat association examples of FIGS. 1E-1G have been described with respect to magnetic fields 181 produced by magnetic resources 180, in other implementations, various other ranging techniques may be used in lieu of, or in addition to, the magnetic fields 181. For example, in some implementations, the magnetic resources 182-184 may be replaced with wireless radios that broadcast radio waves throughout the seating environment 101. The position determination logic 190 may then determine the relative locations of each of the mobile computing devices 131 and 132 based on the signal strengths (e.g., received signal strength indicator values) and/or propagation delays (e.g., round-trip times, Doppler shifts, etc.) of the radio waves as received by the corresponding mobile computing devices.

Mobile Computing Device

Figure 2:
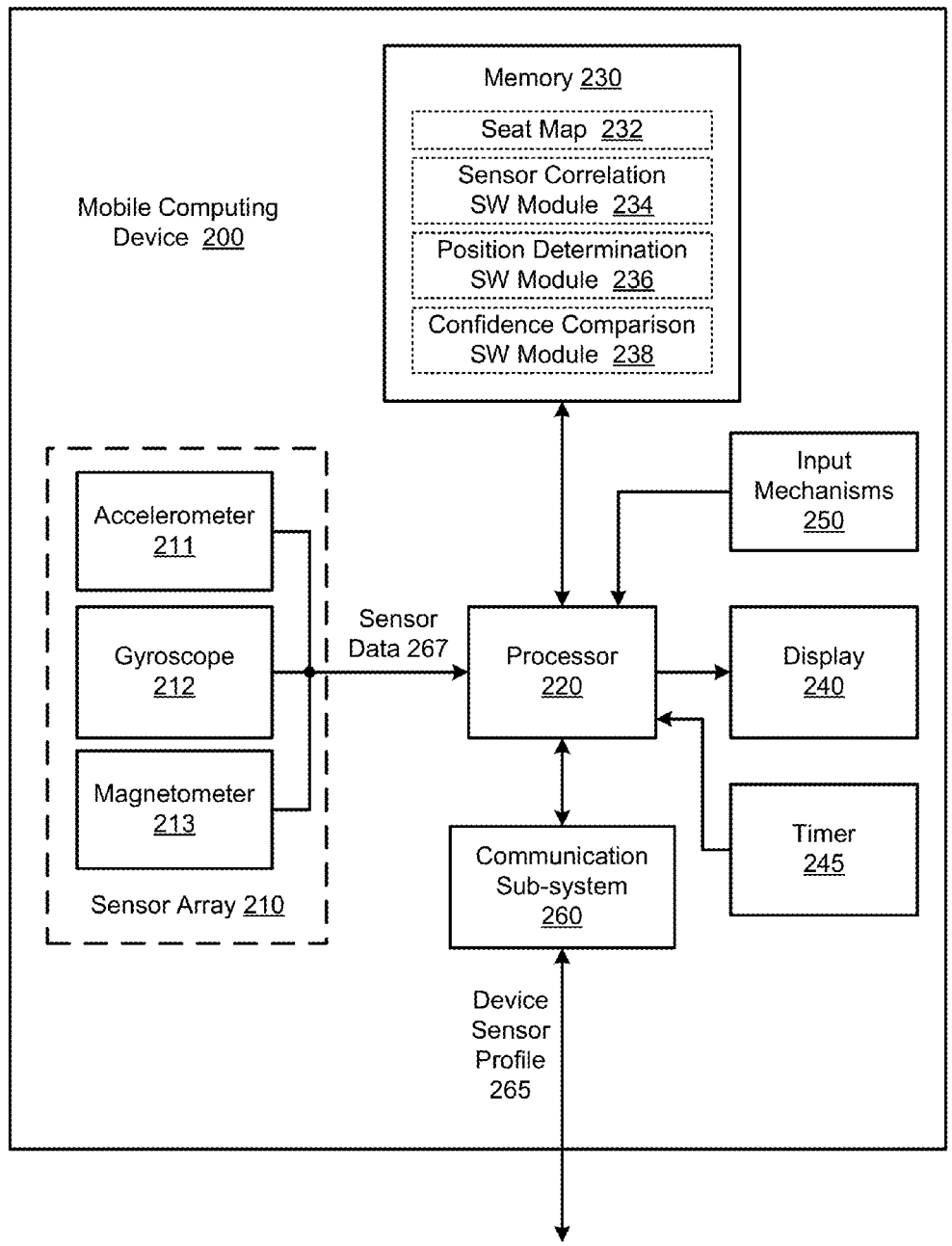
FIG. 2 shows a block diagram of an example mobile computing device in accordance with example implementations.

FIG. 2 shows a block diagram of an example of a mobile computing device 200 in accordance with example embodiments. The mobile computing device 200 may be one implementation of mobile computing devices 131-132 of FIGS. 1A-1G. The mobile computing device 200 includes a sensor array 210, a processor 220, memory 230, a display 240 (e.g., which may be a touch-sensitive display device), a timer 245, input mechanisms 250 (e.g., which may be integrated with the display 340), and a communications sub-system 260 (e.g., which may be used to transmit signals to and receive signals from a local hub, seat sensors, and/or other mobile computing devices). Although FIG. 2 depicts the mobile computing device 200 with a particular set of components, for actual implementations, the mobile computing device 200 may include additional components (not shown for simplicity).

The sensor array 210 includes a number of sensors 211-213 that may be used to detect activity within a seating environment (e.g., seating environment 101 of FIGS. 1A-1G). More specifically, the sensor array 210 may generate sensory data 267 in response to, and indicative of, the detected activity. In a particular implementation, the sensor array 210 may include, for example, an accelerometer 211, a gyroscope 212, and magnetometer 213. The accelerometer 211 may detect (e.g., generate accelerometer data based on) movement and/or acceleration of the mobile computing device 200. The gyroscope 212 may detect an orientation and/or rotation of the mobile computing device 200. The magnetometer 213 may detect (e.g., generate magnetometer data based on) a direction and/or magnitude of a magnetic field in the environment surrounding the mobile computing device 200 (e.g., within the given seating environment). In some aspects, the sensory array 210 may include additional sensors (not shown for simplicity) that may be used to detect other types of activity of the mobile computing device 200 and/or the surrounding environment.

Memory 230 may include persistent storage such as flash memory and transient storage such as dynamic random-access memory. In some aspects, memory 230 may store a seat map 232 for a particular seating environment. In some implementations, the seat map 232 may be pre-stored in memory 230 (e.g., prior to the mobile computing device 200 entering the seating environment). In other implementations, the seat map 232 may be received (e.g., from local hub 110) upon entering the seating environment. In some aspects, the seat map 232 may indicate a pairing of seat sensors (e.g., seat sensors 141-144) to particular seats (e.g., seats 121-124) within the seating environment. In other aspects, the seat map 232 may indicate relative locations of magnetic resources (e.g., magnetic resources 182-184) and/or seats (e.g., seats 121-124) within the seating environment.

Memory 230 may also include a non-transitory computer-readable medium (e.g., one or more nonvolatile memory elements, such as EPROM, EEPROM, Flash memory, a hard drive, etc.) that may store at least the following software (SW) modules:

a sensor correlation SW module 234 to determine a seat association for the mobile computing device 200 based at least in part on a correlation between sensor data from the mobile computing device 200 and seats within the seating environment;

a position determination SW module 236 to determine a seat association for the mobile computing device 200 based at least in part on a relative position of the mobile computing device 200 within the seating environment; and a confidence comparison SW module 238 to determine a degree of confidence of the seat association for the mobile computing device 200 relative to a seat association determination for another mobile computing device within the seating environment.

Each software module includes instructions that, when executed by processor 220, causes the mobile computing device 200 to perform the corresponding functions. The non-transitory computer-readable medium of memory 230 thus includes instructions for performing all or a portion of the operations depicted in FIGS. 11-13.

Processor 220 may be any suitable one or more processors capable of executing scripts or instructions of one or more software programs stored in the mobile computing device 200 (e.g., within memory 230). For example, processor 220 may execute the sensor correlation SW module 234 to determine a seat association for the mobile computing device 200 based at least in part on a correlation between sensor data from the mobile computing device 200 and seats within the seating environment. The processor 220 may also execute the position determination SW module 236 to determine a seat association for the mobile computing device 200 based at least in part on a relative position of the mobile computing device 200 within the seating environment. Still further, the processor 220 may execute the confidence comparison SW module 238 to determine a degree of confidence of the seat association for the mobile computing device 200 relative to a seat association determination for another mobile computing device within the seating environment.

In some aspects, the mobile computing device 200 may provide the seat association determination, as device sensor profile 265, to a local hub and/or other mobile computing devices within the seating environment. Still further, in some aspects, the timer 245 may be used to control durations of time in which to read and/or collect sensor data. For example, the mobile computing device 200 may capture sensor data for ten seconds after a trigger event or receipt of sensor data from one or more seat sensors so that the device sensor profile 265 for the time period matches the time period of the data from the seat sensors.

Local Hub

Figure 3:
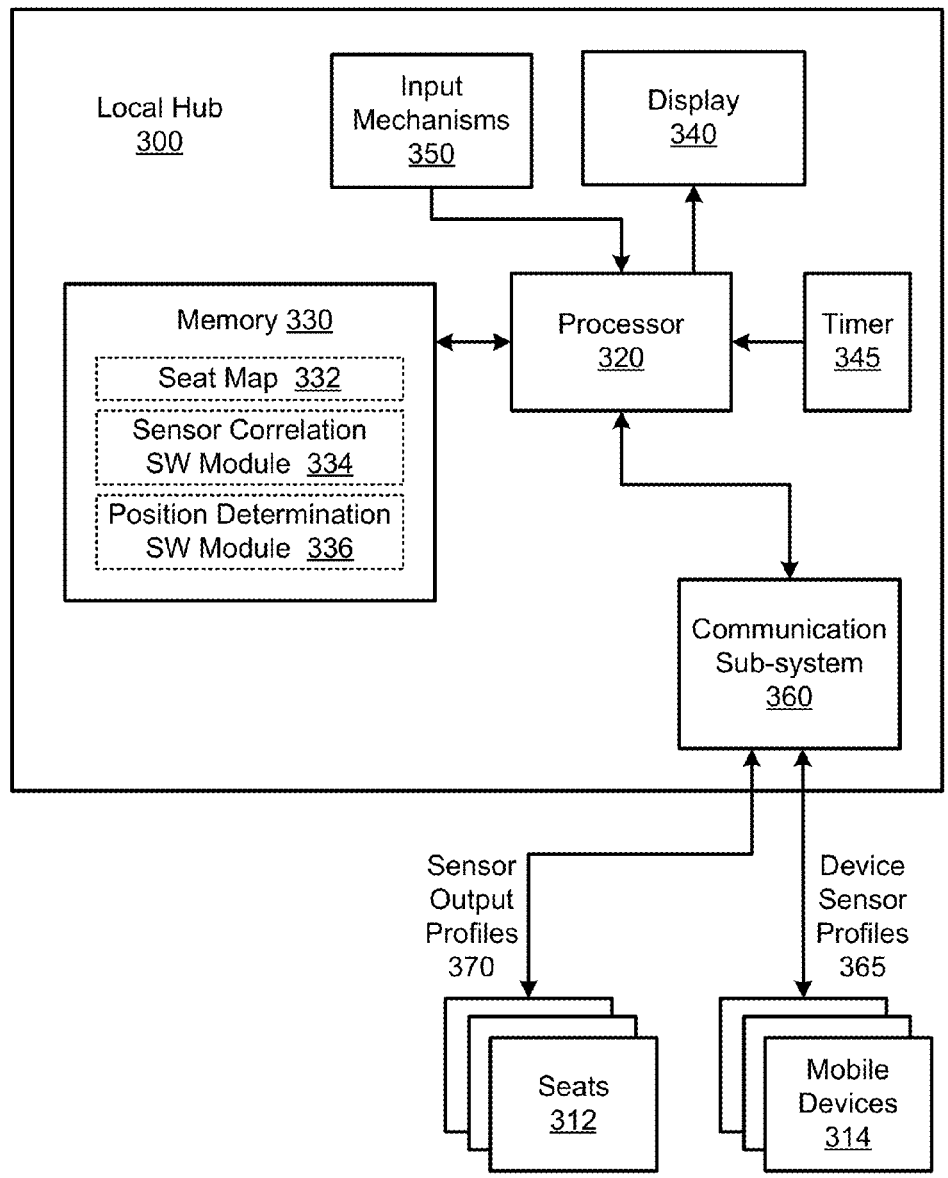
FIG. 3 shows a block diagram of a local hub in accordance with example implementations.

FIG. 3 shows a block diagram of a local hub 300 in accordance with example implementations. The local hub 300 may be one implementation of local hub 100 of FIGS. 1A-1G. The local hub 300 includes a processor 320, memory 330, a display 340 (e.g., which may be a touch-sensitive display device), a timer 345, input mechanisms 350 (e.g., which may be integrated with the display 340), and a communications sub-system 360 (e.g., which may be used to transmit signals to and receive signals from seat sensors and/or mobile computing devices). Although FIG. 3 depicts the local hub 300 with a particular set of components, for actual implementations, the local hub 300 may include additional components (not shown for simplicity).

The communications sub-system 360 may be used to transmit signals to and receive signals from a set of seats 312 and/or mobile computing devices 314 within a given seating environment (see also FIGS. 1A-1G), and may be used to scan the surrounding environment to detect and identify nearby devices (e.g., within wireless range of the local hub 300). In some aspects, the communications sub-system 360 may receive a first set of sensor data, as sensor output profiles 370, from respective seat sensors provided with the seats 312. For example, the sensor output profiles 370 may include accelerometer data indicating a movement and/or acceleration of respective seats 312. Further, the communications sub-system 360 may receive a second set of sensor data, as device sensor profiles 365, from the mobile computing devices 314. For example, the device sensor profiles 365 may include accelerometer data indicating a movement and/or acceleration of respective mobile computing devices 314. Alternatively, or in addition, the device sensor profiles 365 may include magnetometer data indicating a direction and/or magnitude of a magnetic field as detected by respective mobile computing devices 314.

Memory 330 may include persistent storage such as flash memory and transient storage such as dynamic random-access memory. In some aspects, memory 330 may store a seat map 332 for a particular seating environment. In some aspects, the seat map 332 may indicate a pairing of seat sensors to the particular seats 312 within the seating environment. In other aspects, the seat map 332 may indicate relative locations of magnetic resources (e.g., magnetic resources 182-184) and/or seats 312 within the seating environment.

Memory 330 may also include a non-transitory computer-readable medium (e.g., one or more nonvolatile memory elements, such as EPROM, EEPROM, Flash memory, a hard drive, etc.) that may store at least the following software (SW) modules:
- a sensor correlation SW module 334 to determine seat associations for each of the mobile computing devices 314 based at least in part on correlations between sensor data from the mobile computing devices 314 and seats 312 within the seating environment; and
- a position determining SW module 336 to determine seat associations for the mobile computing devices 314 based at least in part on relative positions of the respective mobile computing devices 314 within the seating environment.

Each software module includes instructions that, when executed by processor 320, causes the local hub 300 to perform the corresponding functions. The non-transitory computer-readable medium of memory 330 thus includes instructions for performing all or a portion of the operations depicted in FIGS. 11-13.

Processor 320 may be any suitable one or more processors capable of executing scripts or instructions of one or more software programs stored in the local hub 300 (e.g., within memory 330). For example, processor 320 may execute the sensor correlation SW module 334 to determine seat associations for each of the mobile computing devices 314 based at least in part on correlations between sensor data from the mobile computing devices 314 and seats 312 within the seating environment. The processor 320 may also execute the position determining SW module 336 to determine seat associations for the mobile computing devices 314 based at least in part on relative positions of the respective mobile computing devices 314 within the seating environment.

In some aspects, the local hub 300 may provide the seat association determinations to respective mobile computing devices 314. Still further, in some aspects, the timer 345 may be used to control durations of time in which to collect sensor data. For example, the local hub 300 may instruct sensors on the seats 312 and mobile computing devices 314 to capture respective sensor data for ten seconds after a trigger event so that the device sensor profiles 365 for the time period matches the time period covered by the sensor output profiles 370.

Magnetic Field Inducer

Figure 4:
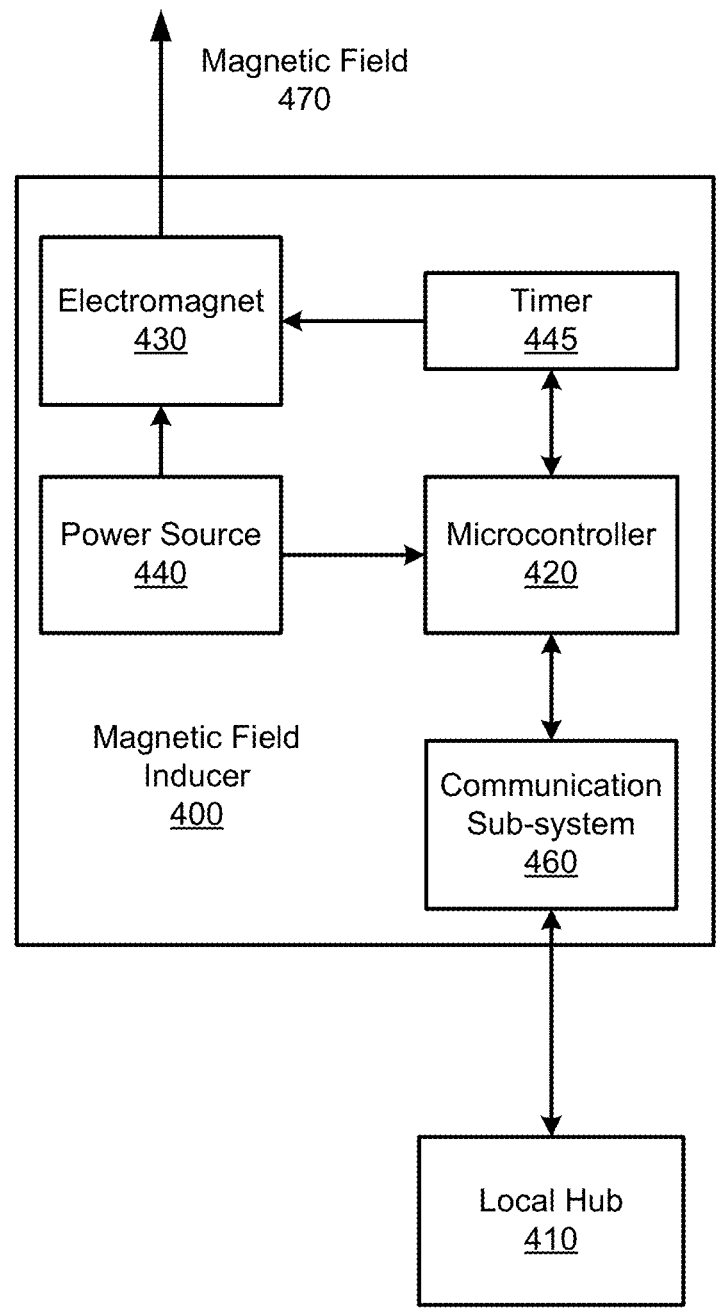
FIG. 4 shows a block diagram of a magnetic field inducer in accordance with example implementations.

FIG. 4 shows a block diagram of a magnetic field inducer 400 in accordance with example implementations. The magnetic field inducer 400 may be one implementation of magnetic resources 182-184 of FIGS. 1E-1G. The magnetic field inducer 400 includes a microcontroller 420, an electromagnet 430, a power source 440, a timer 445, and a communication sub-system 460.

Microcontroller 420 may include a processor core (or integrated circuit), memory, and input/output functionality to control the timer 445 and communication sub-systems 460. In some aspects, communication sub-systems 460 may be used to transmit and receive data over a wireless network (e.g., based on the Wi-Fi Direct specification). For example, the magnetic field inducer 400 may be activated in response to a trigger (e.g., activation signal) form a local hub 410. In some implementations, the magnetic field inducer 400 may be provided at a fixed location within a seating environment. The location of the magnetic field inducer 400 may be known to the local hub 410, along with the respective locations of the individual seats within the seating environment.

The electromagnet 430 may induce or otherwise generate a magnetic field 470 based on current from the power source 440. In some aspects, the timer 445 may control a switching of the electromagnet 430 (e.g., on and off). For example, the magnetic field inducer 400 may generate the magnetic field 470 for a specific amount of time in response to a trigger or activation signal from the timer 445. As described above, with respect to FIGS. 1E-1G, the magnetic fields 470 may be detected by magnetometers on individual mobile devices (not shown) within the seating environment. More specifically, the strengths and/or directions of the magnetic fields 470, as detected by each mobile computing device, may be used to determine a seat association for that mobile computing device.

In some implementations, multiple magnetic field inducers (e.g., similar to magnetic field inducer 400) may be provided within a particular seating environment. In one aspect, each magnetic field inducer may generate a respective magnetic field in a non-overlapping time period from the other magnetic field inducers in the seating environment. For example, the local hub 410 can direct a magnetic field inducer located on or near a driver's seat of a vehicle to generate its magnetic field for five seconds, and then direct a magnetic field inducer on a passenger's seat to generate its magnetic field for five seconds after that. As described in greater detail below, the sequence and/or timing of the magnetic fields may be used to identify and/or differentiate magnetic field inducers placed at different locations within the seating environment.

Vehicle Seating Environment

Figure 5:
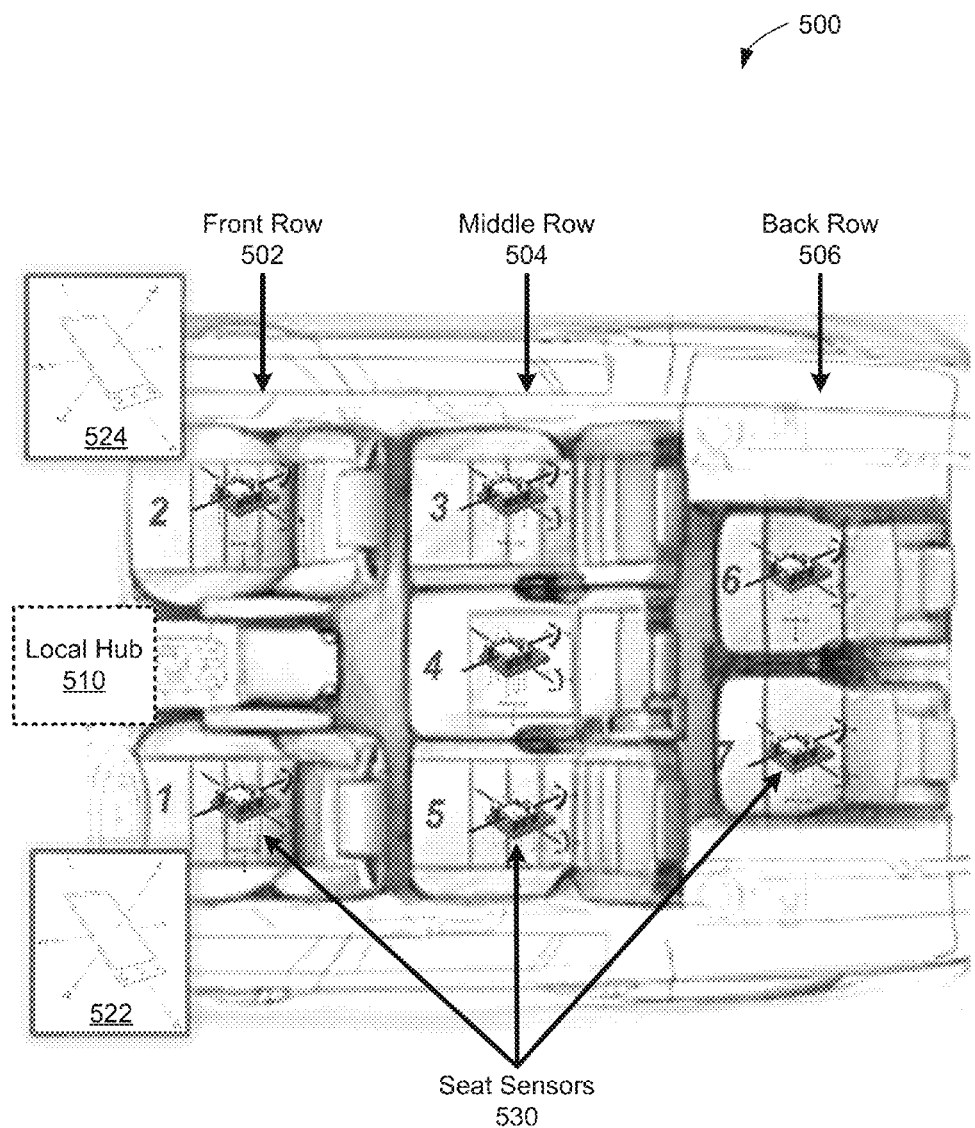
FIG. 5 shows an example vehicle seating environment within which one or more aspects of the disclosure may be implemented.

FIG. 5 shows an example vehicle seating environment 500 within which one or more aspects of the disclosure may be implemented. The vehicle seating environment 500 is depicted as an interior of a vehicle with three seating rows: front row 502, middle 504, and back row 506. The front row 502 includes two seats: seat 1 (e.g., a driver's seat) and seat 2. The middle row 504 includes three seats: seat 3, seat 4, and seat 5. The back row 506 includes two seats: seat 6 and seat 7. Each of the seats 1-7 includes a corresponding seat sensor 530. In some aspects, the seat sensors 530 may include accelerometers that can detect movement and/or acceleration of the respective seats 1-7 (e.g., such as a vertical movement of a user sitting down on a particular seat). A local hub 510 is provided in a center console of the vehicle, in front of the front row 502.

In some implementations, the vehicle seating environment 500 may be dynamically configured (and/or reconfigured) in response to a user sitting down in a particular seat. For example, a driver may enter the seating environment 500 with a mobile computing device 522 and sit down in seat 1. A passenger may enter the vehicle seating environment 500 with a mobile computing device 524 and sit down in seat 2. The local hub 510 may scan for and/or associate with the mobile computing devices 522 and 524 in response to a trigger event. For example, the trigger event may correspond to a user entering the vehicle seating environment 500 (e.g., as detected by the opening and/or closing of a vehicle door, the buckling of a seatbelt, and/or a motion sensor or camera positioned within the vehicle's cabin).

In some aspects, the trigger event may activate the seat sensors 530 and respective device sensors (e.g., accelerometers) on the mobile computing devices 522-524. Sensor correlation logic (not shown for simplicity) provided with the local hub 510 and/or at least one of the mobile computing devices 522-524 collects the sensor data from the mobile computing devices 522-524 and seat sensors 530 and determines a seat association for each of the mobile computing devices 522-524. For example, the sensor correlation logic may determine a degree correlation between sensor data from the mobile computing devices 522-524 and respective seat sensors 530. Then, the sensor correlation logic may associate each of the mobile computing devices 522-524 to the seat with the highest degree of correlation.

In some aspects, each of the seat sensors 530 may measure lateral (e.g., forward or backward) and/or vertical (e.g., upward or downward) movement/acceleration. For example, each of the seat sensors 530 may include a three-dimensional accelerometer that measures acceleration along three axes. When the driver sits down in seat 1, the seat sensor 530 provided with seat 1 can measure a vertical acceleration of seat 1 due to the force of the driver sitting down. Likewise, a device sensor provided with the mobile computing device 522 carried by the driver (e.g., in the user's hand, pocket, or otherwise on the user's person) may experience a similar vertical acceleration when the driver sits down. Thus, the sensor correlation logic may correlate the seat sensor data from seat 1 with the device sensor data from mobile computing device 522 to determine that the user of the mobile computing device 522 is seated in seat 1.

The basis for correlating sensor data from seats 1-7 and mobile computing devices 522-524 may include, for example, an instance of time when the sensor data was collected or generated, a duration of time during which the detected activity (e.g., vertical acceleration) occurs, a magnitude of the acceleration (e.g., how fast the driver sat down on seat 1) as measured by both the seat sensor and the mobile computing device, the presence of seat shifting or lifting (e.g., a user shifting in his or her seat or lifting a leg up) during or after the period in which the user sat down, or other actions which can affect vertical and/or lateral acceleration. Subsequently, when the vehicle begins to move, the lateral turns, bumps, and motion of the vehicle can have different effects on different regions of the vehicle. These characteristics may be reflected as points of correlation or non-correlation when comparing sensor data from the seat sensors 530 and the mobile computing devices 522-524.

As a variation to accelerometers, some embodiments provide for the use of alternative types of motion detection sensors, such as gyroscopes, to detect and measure motion from within the vehicle. Specifically, each of the seat sensors may include a gyroscope. Each of the mobile computing devices 522-524 may also include a gyroscope. In such implementations, the sensor correlation logic may identify correlations and non-correlations in gyroscope data collected from the seat sensors 530 and mobile computing devices 522-524.

In some implementations, the local hub 510 may include a programmatic framework for establishing wireless peer-to-peer communications with other devices and/or sensors in the vehicle seating environment 500. Using the wireless peer-to-peer communications, the local hub 510 may: trigger or otherwise activate the seat sensors 530 and/or respective device sensors of the mobile computing devices 522-524 (e.g., triggered upon the vehicle door opening or closing); collect sensor data from the seat sensors 530 and mobile computing devices 522-524; implement sensor correlation logic to determine a seat association for each of the mobile computing devices 522-524 within the vehicle seating environment 500 based at least in part on the collected sensor data; and/or implement control or other configurations regarding the functionality and use of the vehicle, the mobile computing devices 522-524, and/or the seats 1-7, based on the determined seat associations.

Depending on implementation, the sensor correlation logic may be used to determine: whether any of the mobile computing devices 522-524 is associated with a driver's seat location or passenger's seat location; in which of the rows 502-506 each of the mobile computing devices 522-524 is located; and/or the particular seat, in the vehicle seating environment 500, that is occupied by a respective user of each of the mobile computing devices 522-524.

Figure 6A:
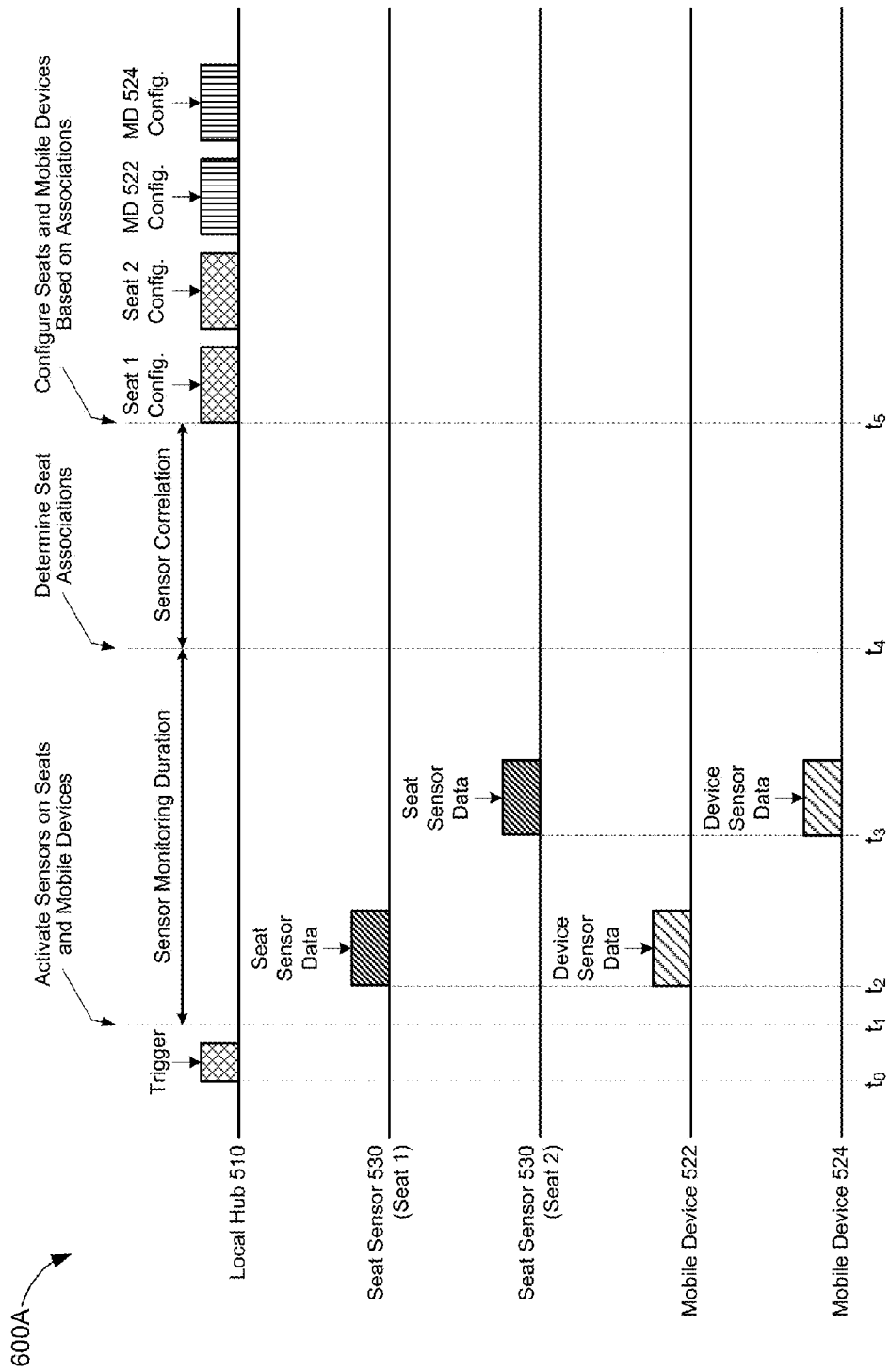
FIG. 6A shows an example timing diagram depicting an operation for determining a seat location of a mobile computing device using a centralized seat association system.

FIG. 6A shows an example timing diagram 600A depicting an operation of determining a seat location of a mobile computing device using a centralized seat association system. With reference for example to FIG. 5, the example operation of FIG. 6A may be implemented by devices and/or components of the vehicle seating environment 500.

At time $t_0$, the local hub 510 broadcasts a trigger signal to each of the seat sensors 530 and mobile computing devices 522-524. For example, the local hub 510 may broadcast the trigger signal in response to a user entering the vehicle seating environment 500 (e.g., as detected by the opening and/or closing of a vehicle door, the buckling of a seatbelt, and/or a motion sensor or camera position within the vehicle's cabin). In some aspects, the trigger signal may activate the seat sensors 530 and respective device sensors on the mobile computing devices 522-524, and cause the sensors to begin sensing activity (e.g., movement) within the vehicle seating environment 500. More specifically, the trigger signal may indicate the start of a sensor monitoring duration (e.g., from times $t_1$ to $t_4$) during which the local hub 510 listens for and collects sensor data from the seat sensors 530 and device sensors provided with mobile computing devices 522-524. In some aspects, the local hub 510 may periodically rebroadcast the trigger signal during the sensor monitoring duration (e.g., in case any mobile computing devices enter the vehicle seating environment 500 and/or come within wireless communications range of the local hub 510 after the original trigger signal has been broadcast at time $t_0$).

At time $t_2$, the driver of the vehicle sits down on seat 1. The movement or impact of the driver sitting down is detected by the seat sensor 530 provided with seat 1, which transmits seat sensor data to the local hub 510, at time $t_2$, in response to the impact. For example, the seat sensor data may include accelerometer data indicating a direction and/or magnitude of the movement as detected by the seat sensor 530 of seat 1. The movement or impact of the driver sitting down is also detected by a device sensor provided with mobile computing device 522 (e.g., carried by the driver), which transmits device sensor data to the local hub 510, at time $t_2$, in response to the detected movement. The device sensor data may also include accelerometer data indicating a direction and/or magnitude of the movement as detected by the mobile computing device 522.

At time $t_3$, a passenger of the vehicle sits down on seat 2. The movement or impact of the passenger sitting down is detected by the seat sensor 530 provided with seat 2, which transmits seat sensor data to the local hub 510, at time $t_3$, in response to the impact. The movement or impact of the passenger sitting down on seat 2 is also detected by a device sensor provided with mobile computing device 524 (e.g., carried by the passenger), which transmits device sensor data to the local hub 510, at time $t_3$, in response to the detected movement.

Upon expiration of the sensor monitoring duration, at time $t_4$, the local hub 510 may compare the seat sensor data collected from the seat sensors 530 with the device sensor data collected from the mobile computing devices 522-524 to determine a respective seat association for each of the mobile computing devices 522-524. In some aspects, the local hub 510 may implement sensor correlation logic to determine a degree of correlation between sensor data from each of the mobile computing devices 522-524 and respective seat sensors 530. The local hub 510 may then associate each of the mobile computing devices 522-524 to the seat with the highest degree of correlation.

For example, the local hub 510 may determine that, at time $t_2$, the seat sensor data collected from the seat sensor 530 of seat 1 (e.g., the magnitude and/or direction of the detected motion) is substantially similar to the device sensor data collected from mobile computing device 522. More specifically, the local hub 510 may determine that the device sensor data (e.g., from mobile computing device 522) collected at time $t_2$ more closely matches the seat sensor data from seat 1 than any other seat sensor data collected at that time. Thus, the local hub 510 may associate the mobile computing device 522 with seat 1.

Furthermore, the local hub 510 may determine that, at time $t_3$, the seat sensor data collected from the seat sensor 530 of seat 2 is substantially similar to the device sensor data collected from mobile computing device 524. More specifically, the local hub 510 may determine that the device sensor data (e.g., from mobile computing device 524) collected at time $t_3$ more closely matches the seat sensor data from seat 2 than any other seat sensor data collected at that time. Thus, the local hub 510 may associate the mobile computing device 524 with seat 2.

Then, at time $t_5$, the local hub 510 may adjust one or more configurations for the seats 1-7 and/or mobile computing device 522-524 within the seating environment 500 based at least in part on the determined seat associations. For example, the local hub 510 may adjust one or more settings of seat 1 and/or mobile computing device 522 (e.g., based on known preferences of the driver) by sending respective configuration instructions to seat 1 and mobile computing device 522. The local hub 510 may adjust one or more settings of seat 2 and/or mobile computing device 524 (e.g., based on known preferences of the passenger) by sending respective configuration instructions to seat 2 and mobile computing device 524.

Figure 6B:
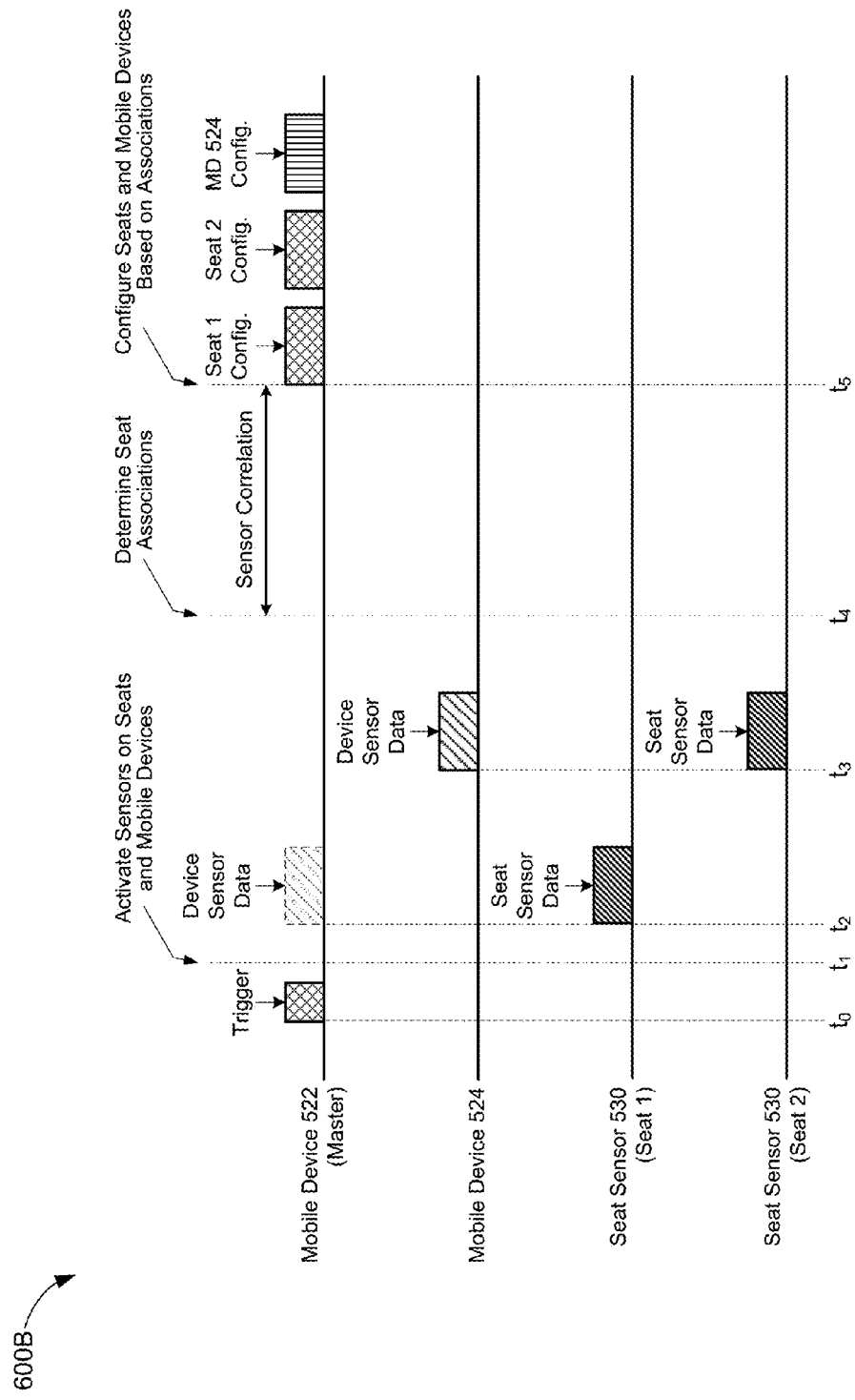
FIG. 6B shows an example timing diagram depicting an operation for determining a seat location of a mobile computing device using a distributed seat association system.

FIG. 6B shows an example timing diagram 600B depicting an operation for determining a seat location of a mobile computing device using a distributed seat association system. With reference, for example, to FIG. 5, the example operation of FIG. 6B may be implemented by devices and/or components of the vehicle seating environment 500. In the example of FIG. 6B, mobile computing device 522 may be assigned the role of master device. In some aspects, the role of master device may be assigned based on predefined logic (e.g., first mobile computing device to enter the vehicle seating environment 500).

At time $t_0$, the master device 522 broadcasts a trigger signal to each of the seat sensors 530 and to mobile computing device 524. For example, the master device 522 may broadcast the trigger signal upon entering the vehicle seating environment 500 and/or upon sensing mobile computing device 724 in the vicinity (e.g., within wireless communication range) of the master device 522. The master device 522 may detect that it is within the vehicle seating environment 500 in a number of ways (e.g., using RFID sensors, GPS data, etc.) that are well-known in the art. In some aspects, the trigger signal may activate the seat sensors 530 and respective device sensors on the mobile computing devices 522-524, and cause the sensors to begin sensing activity within the vehicle seating environment 500. More specifically, the trigger signal may indicate the start of a sensor monitoring duration (e.g., from times $t_1$ to $t_4$) during which the master device 522 listens for and collects sensor data from the seat sensors 530 and device sensors provided with mobile computing devices 522-524. In some aspects, the master device 522 may periodically rebroadcast the trigger signal during the sensor monitoring duration (e.g., in case any mobile computing devices enter the vehicle seating environment 500 and/or come within wireless communications range of the master device 522 after the original trigger signal has been broadcast at time $t_0$).

At time $t_2$, the driver of the vehicle sits down on seat 1. The movement or impact of the driver sitting down on seat 1 is detected by the seat sensor 530 provided with seat 1, which transmits seat sensor data to the master device 522, at time $t_2$, in response to the impact. For example, the seat sensor data may include accelerometer data indicating a direction and/or magnitude of the movement as detected by the seat sensor 530 of seat 1. The movement or impact of the driver sitting down is also detected by a device sensor provided with the master device 522 (e.g., carried by the driver), which generates device sensor data, at time $t_2$, in response to the detected movement. The device sensor data may also include accelerometer data indicating a direction and/or magnitude of the movement as detected by the master device 522.

At time $t_3$, a passenger of the vehicle sits down on seat 2. The movement or impact of the passenger sitting down is detected by the seat sensor 530 provided with seat 2, which transmits seat sensor data to the local hub 510, at time $t_3$, in response to the impact. The movement or impact of the passenger sitting down on seat 2 is also detected by a device sensor provided with mobile computing device 524 (e.g., carried by the passenger), which transmits device sensor data to the master device 522, at time $t_3$, in response to the detected movement.

Upon expiration of the sensor monitoring duration, at time $t_4$, the master device 522 may compare the seat sensor data collected from the seat sensors 530 with the device sensor data collected form the mobile computing devices 522-524 to determine a respective seat association for each of the mobile computing devices 522-524. For example, the master device 522 may implement sensor correlation logic to determine a degree of correlation between sensor data from each of the mobile computing devices 522-524 and respective seat sensors 530. The master device 522 may then associate each of the mobile computing devices 522-524 to the seat with the highest degree of correlation.

For example, the master device 522 may determine that, at time $t_2$, the seat sensor data collected from the seat sensor 530 of seat 1 (e.g., the magnitude and/or direction of the detected motion) is substantially similar to the device sensor data generated by the master device 522. More specifically, the master device 522 may determine that the device sensor data (e.g., from the master device 522) collected at time $t_2$ more closely matches the seat sensor data from seat 1 than any other seat sensor data collected at that time. Thus, master device 522 may associate itself with seat 1.

Further, the master device 522 may determine that, at time $t_3$, the seat sensor data collected form the seat sensor 530 of seat 2 is substantially similar to the device sensor data collected form mobile computing device 524. More specifically, the master device 522 may determine that the device sensor data (e.g., from mobile computing device 524) collected at time $t_3$ more closely matches the seat sensor data from seat 2 than any other seat sensor data collected at that time. Thus, the master device 522 may associate the mobile computing device 524 with seat 2.

Then, at time $t_5$, the master device 522 may adjust one or more configurations for the seats 1-7 and/or mobile computing devices 522-524 within the seating environment 500 based at least in part on the determined seat associations. The master device 522 may adjust its own device settings and/or one or more settings of seat 1 (e.g., based on known preferences of the driver), for example, by sending a set of configuration instructions to seat 1. The master device 522 may adjust one or more settings of seat 2 and/or mobile computing device 524 (e.g., based on known preferences of the passenger) by sending respective configuration instructions to seat 2 and mobile computing device 524.

Figure 7:
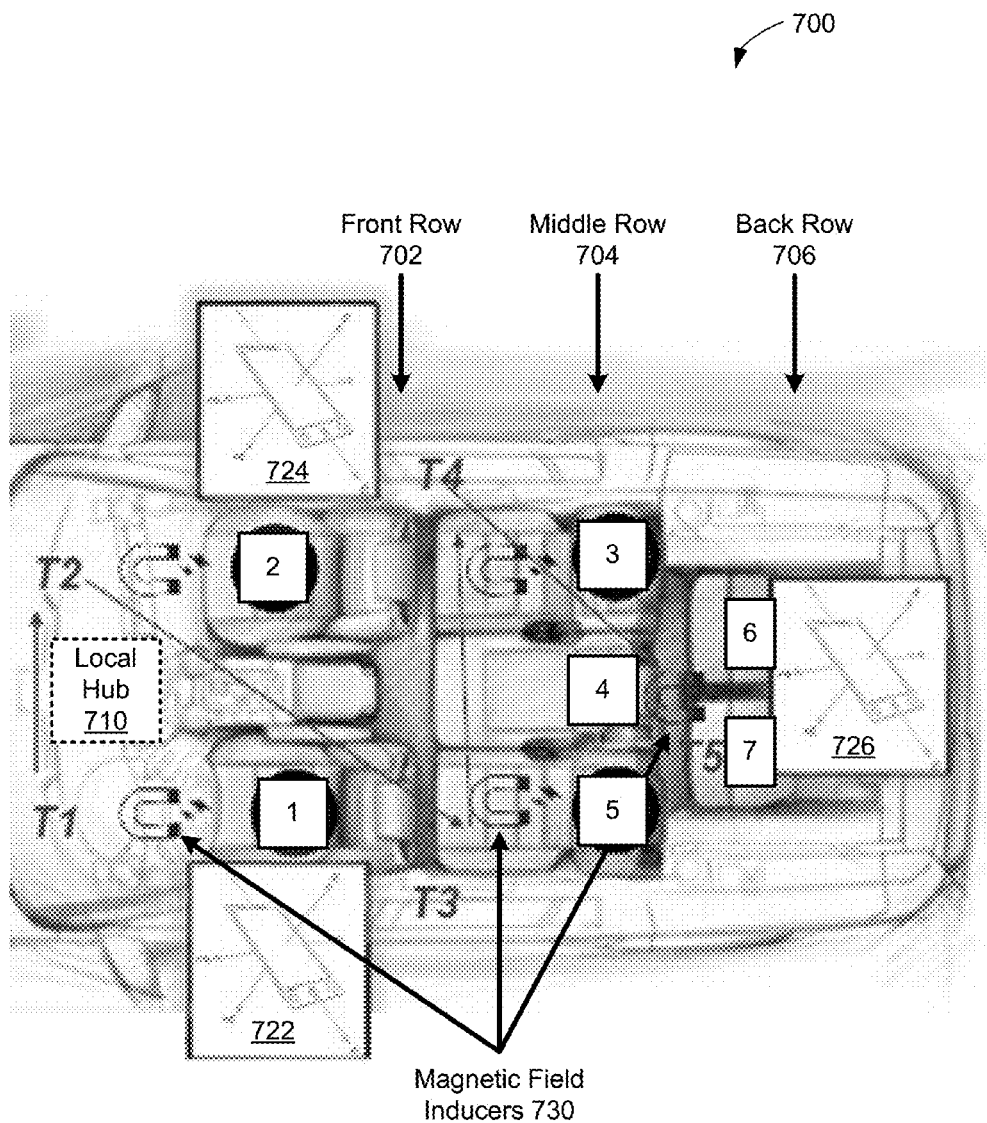
FIG. 7 shows an example vehicle seating environment with magnetic field inducers within which one or more aspects of the disclosure may be implemented.

FIG. 7 shows an example vehicle seating environment 700 with magnetic field inducers within which one or more aspects of the disclosure may be implemented. The vehicle seating environment 700 is depicted as an interior of a vehicle with three seating rows: front row 702, middle row 704, and back row 706. The front row 702 includes two seats: seat 1 (e.g., a driver's seat) and seat 2. The middle row 704 includes three seats: seat 3, seat 4, and seat 5. The back row 706 includes two seats: seat 6 and seat 7. The vehicle seating environment 700 also includes a set of magnetic field inducers 730.

In some implementations, the vehicle seating environment 700 may be dynamically configured (and/or reconfigured) in response to a user sitting down in a particular seat. For example, a driver may enter the seating environment 700 with a mobile computing device 722 and sit down in seat 1. A passenger may enter the vehicle seating environment 700 with a mobile computing device 724 and sit down in seat 2. Another passenger may enter the vehicle seating environment 700 with a mobile computing device 726 and sit down in seat 6. The local hub 710 may scan for and/or associate with the mobile computing devices 722-726 in response to a trigger event. For example, the trigger event may correspond to at least one of the users entering the vehicle seating environment 700 (e.g., as detected by the opening and/or closing of a vehicle door or a motion sensor or camera positioned within the vehicle's cabin).

In some aspects, the trigger event may activate the magnetic field inducers 730 and respective device sensors (e.g., magnetometers) on the mobile computing device 722-726. Position determination logic (not shown for simplicity) provided with the local hub 710 and/or at least one of the mobile computing devices 722-726 collects the sensor data from respective device sensors of the mobile computing devices 722-726 and determines a seat association for each of the mobile computing devices 722-726. For example, the position determination logic may determine a relative proximity of each of the mobile computing devices 722-726 to each of the magnetic field inducers 730. Then, based on known locations of the magnetic field inducers 730 within the vehicle seating environment 700, the position determination logic may determine a closeness of each of the mobile computing devices 722-726 to each of the seats 1-7. Accordingly, the position determination logic may associate each of the mobile computing devices 722-726 to the seat that is closest in proximity to that mobile computing device.

In some aspects, each of the magnetic field inducers 730 may be activated (e.g., turned on and off) in a particular sequence or order to generate respective magnetic fields at different locations within the vehicle seating environment 700 and at different instances of time. In the example of FIG. 7, the magnetic field inducers may be activated in the following sequence: the magnetic field inducer 730 provided on or near seat 1 is activated first (e.g., at time T1); the magnetic field inducer 730 provided on or near seat 2 is activated second (e.g., at time T2); the magnetic field inducer 730 provided on or near seat 5 is activated third (e.g., at time T3); the magnetic field inducer 730 provided on or near seat 3 is activated fourth (e.g., at time T4); and the magnetic field inducer provided between seats 6 and 7 is activated last (e.g., at time T5). This allows each of the magnetic field inducers 730 to be independently identifiable and/or distinguishable by the mobile computing devices 722-726 based on their respective magnetic fields.

For example, mobile computing device 722 may produce its strongest magnetic field reading when the first magnetic field inducer 730 is activated (e.g., at time T1); mobile computing device 724 may produce its strongest magnetic field reading when the second magnetic field inducer 730 is activated (e.g., at time T2); and mobile computing device 726 may produce its strongest magnetic field reading when the last magnetic field inducer 730 is activated (e.g., at time T5). Based on sensor data collected the mobile computing devices 722-726, the position determination logic may determine that mobile computing device 722 is most proximately located to the first inducer 730, mobile computing device 724 is most proximately located to the second inducer 730, and mobile computing device 726 is most proximately located to the fifth and final inducer 730. Then, based on the known locations of each of the magnetic field inducers 730 within the vehicle seating environment 700, the position determination logic may determine that the user of mobile computing device 722 is seated in seat 1, the user of mobile computing device 724 is seated in seat 2, and the user of mobile computing device 726 is seated in the back row 706 (e.g., in this example, it may not be necessary to distinguish between seat 6 or seat 7 of the back row 706).

In some implementations, the local hub 710 may include a programmatic framework for establishing wireless peer-to-peer communications with other devices and/or sensors in the vehicle seating environment 700. Using the wireless peer-to-peer communications, the local hub 710 can may: trigger or otherwise activate the magnetic field inducers 730 to generate respective magnetic fields; trigger or activate respective device sensors of the mobile computing devices 722-726 to detect the magnetic fields; collect sensor data from the mobile computing devices 722-726; implement position determination logic to determine a seat association for each of the mobile computing devices 722-726 within the vehicle seating environment 700 based at least in part on the collected sensor data; and/or implement control or other configurations regarding the functionality and use of the vehicle, mobile computing devices 722-726, and/or seats 1-7, based on the determined seat associations.

Depending on implementation, the position determination logic may be used to determine: whether any of the mobile computing devices 722-726 is associated with a driver's seat location or passenger's seat location; in which of the rows 702-706 each of the mobile computing devices 722-726 is located; and/or the particular seat, in the vehicle seating environment 700, that is occupied by a respective user of each of the mobile computing devices 722-726.

FIG. 8A shows an example timing diagram 800A depicting an operation for determining a seat location of a mobile computing device using magnetic field inducers in a centralized seat association system. With reference for example to FIG. 7, the example operation of FIG. 8A may be implemented by devices and/or components of the vehicle seating environment 700. Although the example of FIG. 7 shows three mobile computing devices 722, 724, and 726, for simplicity, the example operation of FIG. 8A is described only with respect to two of the mobile computing devices 722 and 724.

At time $t_0$, the local hub 710 broadcasts a trigger signal to each of the mobile computing devices 722-724. For example, the local hub 710 may broadcast the trigger signal in response to a user entering the vehicle seating environment 700 (e.g., as detected by the opening and/or closing of a vehicle door or a motion sensor or camera position within the vehicle's cabin). In some aspects, the trigger signal may activate respective device sensors on the mobile computing devices 722-724, and cause the sensors to begin sensing activity (e.g., magnetic fields) within the vehicle seating environment 700.

Furthermore, the trigger signal may initiate a magnetic field activation sequence (e.g., from times $t_1$ to $t_6$) during which each of the magnetic field inducers 730 takes turns generating (e.g., turning on and turning off) a respective magnetic field. For example, at time $t_1$, the magnetic field inducer 730 provided on or near seat 1 is activated (e.g., for a given duration) and subsequently deactivated. At time $t_2$, the magnetic field inducer 730 provided on or near seat 2 is activated (e.g., for a given duration) and subsequently deactivated. Although not shown for simplicity, this sequence continues (e.g., as described above with respect to FIG. 7) until each of the magnetic field inducers 730 has been activated at least once (e.g., at time $t_6$).

Device sensors of the mobile computing devices 722-724 may remain active for the duration of the magnetic field activation sequence (e.g., from times $t_1$ to $t_6$) to listen for and measure the induced magnetic fields. In some aspects, the local hub 710 may periodically rebroadcast the trigger signal during the magnetic field activation sequence (e.g., in case any mobile computing devices enter the vehicle seating environment 700 and/or come within wireless communications range of the local hub 710 after the original trigger signal has been broadcast at time $t_0$).

Upon completion of the magnetic field activation sequence, at time $t_6$, the local hub 710 may collect sensor data from each of the mobile computing devices 722-724. For example, mobile computing device 722 may report its device sensor data to the local hub 710 at time $t_6$, and mobile computing device 724 may report its device sensor data to local hub 710 at time $t_7$. The device sensor data may indicate the direction and/or strength of the magnetic field detected by each of the mobile computing devices 722 and 724 at discrete points in time during the magnetic field activation sequence (e.g., from times $t_1$ to $t_6$).

At time $t_8$, the local hub 710 may compare the device sensor data collected from the mobile computing devices 722-724 to determine a respective seat association for each of the mobile computing devices 722-724. In some aspects, the local hub 710 may implement position determination logic to determine a degree of correlation between the activation times for each of the magnetic field inducers 730 and the sensor data collected from each of the mobile computing devices 722-724. For example, the position determination logic may determine a relative proximity of each of the mobile computing devices 722-724 to each of the magnetic field inducers 730 based on the received sensor data, and may then determine a closeness of each of the mobile computing devices 722-724 to each of the seats 1-7 based on known locations of the magnetic field inducers 730 within the vehicle seating environment 700. Accordingly, the position determination logic may associate each of the mobile computing devices 722-724 to the seat that is closest in proximity to that mobile computing device.

For example, the local hub 710 may determine that the magnetic field strength detected by mobile computing device 722 was greatest at time $t_1$ (e.g., when the magnetic field inducer 730 closest to seat 1 was activated). More specifically, the local hub 710 may determine that the strength of the magnetic field detected by mobile computing device 722 (e.g., at time $t_1$) was greater than that which was detected by any other mobile computing device at time $t_1$. Thus, the local hub 710 may associate the mobile computing device 722 with seat 1.

Further, the local hub 710 may determine that the magnetic field strength detected by mobile computing device 724 was greatest at time $t_2$ (e.g., when the magnetic field inducer 730 closest to seat 2 was activated). More specifically, the local hub 710 may determine that the strength of the magnetic field detected by mobile computing device 724 (e.g., at time $t_2$) was greater than that which was detected by any other mobile computing device at time $t_2$. Thus, the local hub 710 may associate the mobile computing device 724 with seat 2.

Then, at time $t_9$, the local hub 710 may adjust one or more configurations for the seats 1-7 and/or mobile computing device 722-724 within the seating environment 700 based at least in part on the determined seat associations. For example, the local hub 710 may adjust one or more settings of seat 1 and/or mobile computing device 722 (e.g., based on known preferences of the driver) by sending respective configuration instructions to seat 1 and mobile computing device 722. The local hub 710 may adjust one or more settings of seat 2 and/or mobile computing device 724 (e.g., based on known preferences of the passenger) by sending respective configuration instructions to seat 2 and mobile computing device 724.

Figure 8B:
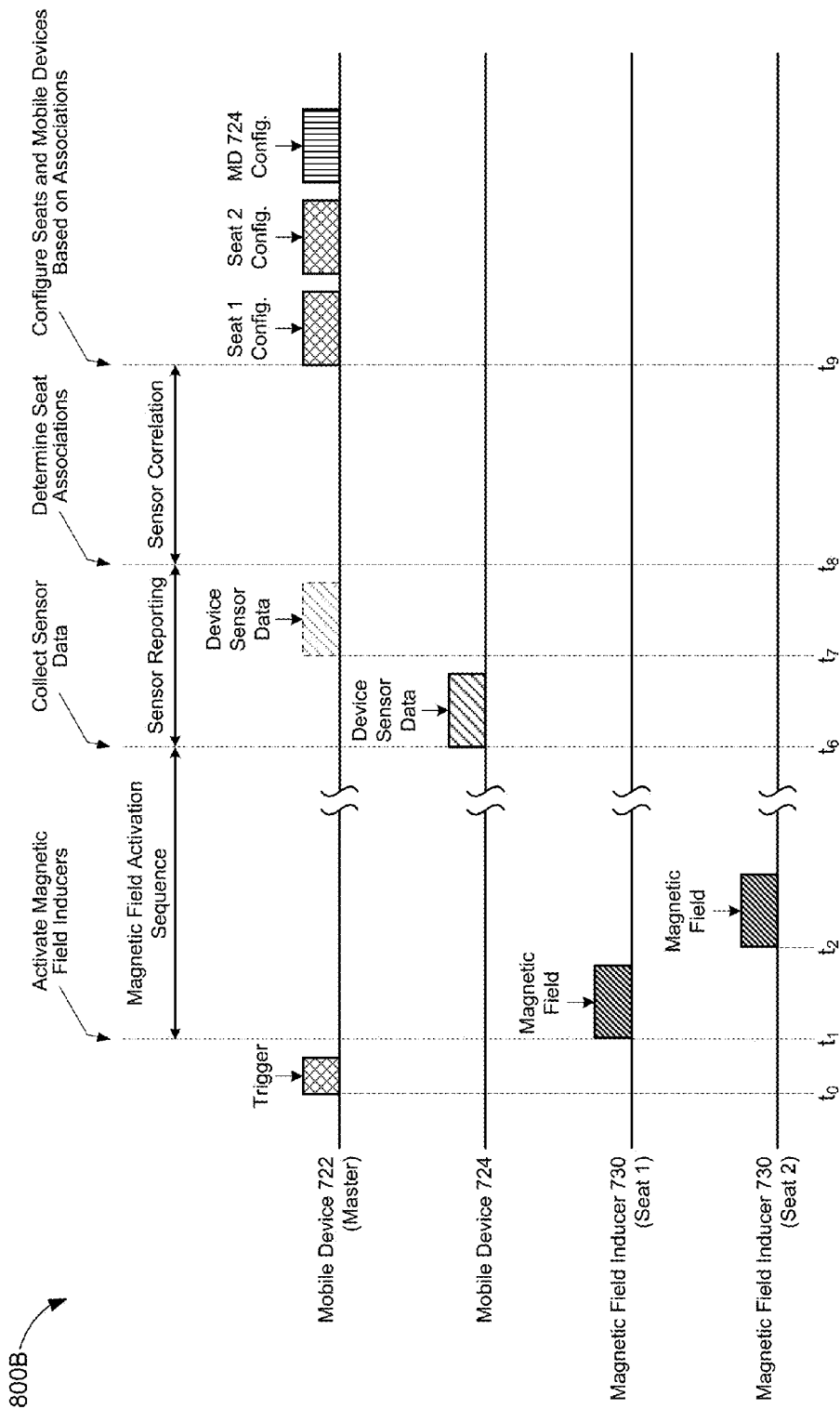
FIG. 8B shows an example timing diagram depicting an operation for determining a seat location of a mobile computing device using magnetic field inducers in a distributed seat association system.

FIG. 8B shows an example timing diagram 800B depicting an operation for determining a seat location of a mobile computing device using magnetic field inducers in a distributed seat association system. With reference, for example, to FIG. 7, the example operation of FIG. 8B may be implemented by devices and/or components of the vehicle seating environment 700. Although the example of FIG. 7 shows three mobile computing devices 722, 724, and 726, for simplicity, the example operation of FIG. 8B is described only with respect to two of the mobile computing devices 722 and 724. In the example of FIG. 8B, mobile computing device 722 may be assigned the role of master device. In some aspects, the role of master device may be assigned based on predefined logic (e.g., first mobile computing device to enter the vehicle seating environment 700).

At time $t_0$, the master device 722 broadcasts a trigger signal to the mobile computing device 724. For example, the master device 722 may broadcast the trigger signal upon entering the vehicle seating environment 700 and/or upon sensing mobile computing device 724 in the vicinity (e.g., within wireless communication range) of the master device 722. The master device 722 may detect that it is within the vehicle seating environment 700 in a number of ways (e.g., using RFID sensors, GPS data, etc.) that are well-known in the art. In some aspects, the trigger signal may activate respective device sensors on the mobile computing devices 722-724, and cause the sensors to begin sensing activity within the vehicle seating environment 700.

Furthermore, the trigger signal may initiate a magnetic field activation sequence (e.g., from times $t_1$ to $t_6$) during which each of the magnetic field inducers 730 takes turns generating (e.g., turning on and turning off) a respective magnetic field. For example, at time $t_1$, the magnetic field inducer 730 provided on or near seat 1 is activated (e.g., for a given duration) and subsequently deactivated. At time $t_2$, the magnetic field inducer 730 provided on or near seat 2 is activated (e.g., for a given duration) and subsequently deactivated. Although not shown for simplicity, this sequence continues (e.g., as described above with respect to FIG. 7) until each of the magnetic field inducers 730 has been activated at least once (e.g., at time $t_6$).

Device sensors of the mobile computing devices 722-724 may remain active for the duration of the magnetic field activation sequence (e.g., from times $t_1$ to $t_6$) to listen for and measure the induced magnetic fields. In some aspects, the master device 722 may periodically rebroadcast the trigger signal during the sensor monitoring duration (e.g., in case any mobile computing devices enter the vehicle seating environment 700 and/or come within wireless communications range of the master device 722 after the original trigger signal has been broadcast at time $t_0$).

Upon completion of the magnetic field activation sequence, at time $t_6$, the master device 722 may collect sensor data from mobile computing device 724 and one or more device sensors provided with the master device 722. For example, mobile computing device 724 may report its device sensor data to the master device 722 at time $t_6$, and the master device 722 may acquire device sensor data from its own device sensors at time $t_7$. The device sensor data may indicate the direction and/or strength of the magnetic field detected by each of the mobile computing devices 722 and 724 at discrete points in time during the magnetic field activation sequence (e.g., from times $t_1$ to $t_6$).

At time $t_8$, the master device 722 may compare the device sensor data collected from the mobile computing devices 722-724 to determine a respective seat association for each of the mobile computing devices 722-724. In some aspects, the master device 722 may implement position determination logic to determine a degree of correlation between the activation times for each of the magnetic field inducers 730 and the sensor data collected from each of the mobile computing devices 722-724. For example, the position determination logic may determine a relative proximity of each of the mobile computing devices 722-724 to each of the magnetic field inducers 730 based on the received sensor data, and may then determine a closeness of each of the mobile computing devices 722-724 to each of the seats 1-7 based on known locations of the magnetic field inducers 730 within the vehicle seating environment 700. Accordingly, the position determination logic may associate each of the mobile computing devices 722-724 to the seat that is closest in proximity to that mobile computing device.

For example, the master device 722 may determine that the magnetic field strength detected by its own device sensors was greatest at time $t_1$ (e.g., when the magnetic field inducer 730 closest to seat 1 was activated). More specifically, the master device 722 may determine that the strength of the magnetic field detected by its own device sensors (e.g., at time $t_1$) was greater than that which was detected by any other mobile computing device at time $t_1$. Thus, the master device 722 may associate itself with seat 1.

Further, the master device 722 may determine that the magnetic field strength detected by mobile computing device 724 was greatest at time $t_2$ (e.g., when the magnetic field inducer 730 closest to seat 2 was activated). More specifically, the master device 722 may determine that the strength of the magnetic field detected by mobile computing device 724 (e.g., at time $t_2$) was greater than that which was detected by any other mobile computing device at time $t_2$. Thus, the master device 722 may associate the mobile computing device 724 with seat 2.

Then, at time $t_9$, the master device 722 may adjust one or more configurations for the seats 1-7 and/or mobile computing devices 722-724 within the seating environment 700 based at least in part on the determined seat associations. The master device 722 may adjust its own device settings and/or one or more settings of seat 1 (e.g., based on known preferences of the driver), for example, by sending a set of configuration instructions to seat 1. The master device 722 may adjust one or more settings of seat 2 and/or mobile computing device 7524 (e.g., based on known preferences of the passenger) by sending respective configuration instructions to seat 2 and mobile computing device 724.

Figure 9:
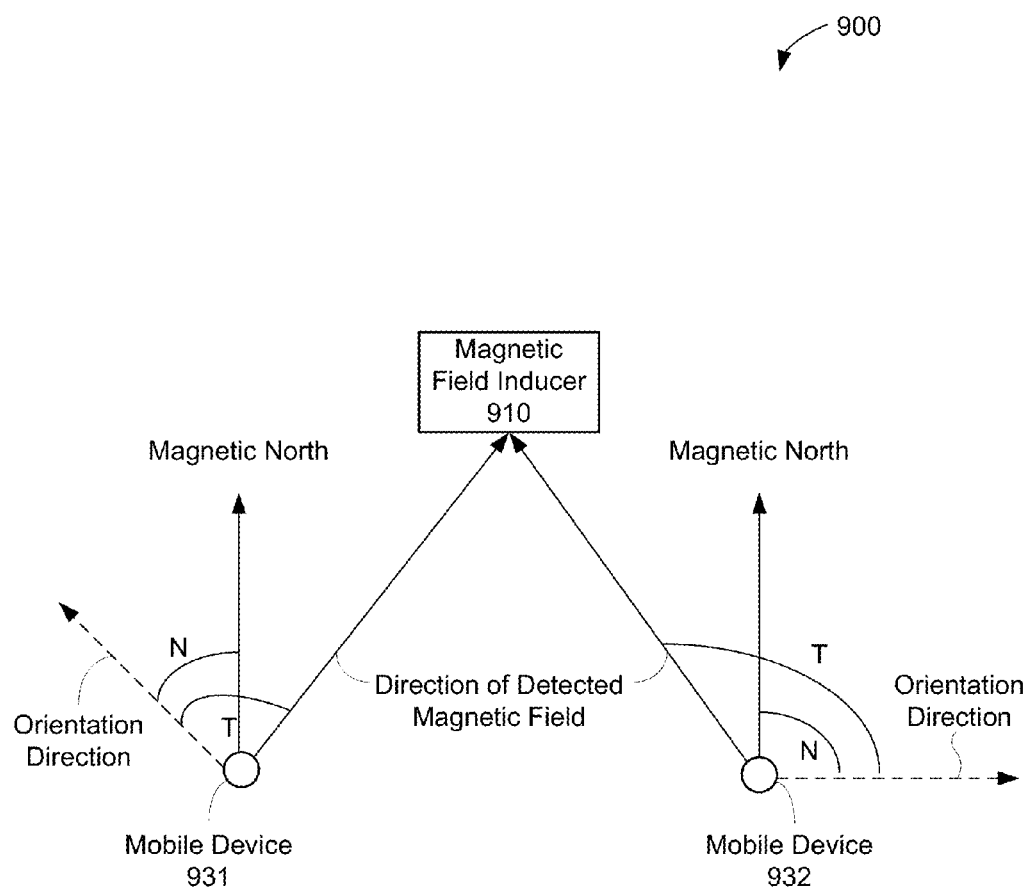
FIG. 9 shows an example system for ranging and positioning using magnetic fields.

FIG. 9 shows an example system 900 for ranging and positioning using magnetic fields. The system 900 includes a magnetic field inducer 910 and mobile devices 931 and 932. The magnetic field inducer 910 may or may not be located on or near a particular seat in a given seating environment. Mobile devices 931 and 932 are within sensing range of a magnetic field generated by the magnetic field inducer 910, and are equipped with magnetometers to detect the magnetic field.

In the example of FIG. 9, mobile device 931 is oriented (e.g., pointing) in a north-western direction and mobile device 932 is oriented in an eastern direction. Angle T represents the angle between the orientation direction of a mobile device and the direction of the detected magnetic field (e.g., generated by the magnetic field inducer 910). Angle N represents the angle between the orientation direction of a mobile device and magnetic north (e.g., which can be located using a compass, gyrocompass, or other similar component on the mobile communication device). By subtracting angle N from angle T, a normalized angle to the magnetic field inducer with respect to magnetic north can be calculated. Based on this angle, position determination logic (not shown for simplicity) can calculate in which direction the mobile device is from the magnetic field inducer 910. For example, position determination logic may determine that mobile device 931 is south-west of the magnetic field inducer 910 whereas mobile computing device 932 is south-east of the magnetic field inducer 910.

Thus, based on magnetometer data from the mobile devices 931 and 932 and the location of the magnetic field inducer 910 (e.g., within a given seating environment), position determination logic may determine a relative precise location of each of mobile device within the seating environment. The position determination logic may further correlate each of the mobile devices 931 and 932 to a particular seat in the seating environment, for example, based on known locations of the individual seats (e.g., as provided in a seat map).

Figure 10:
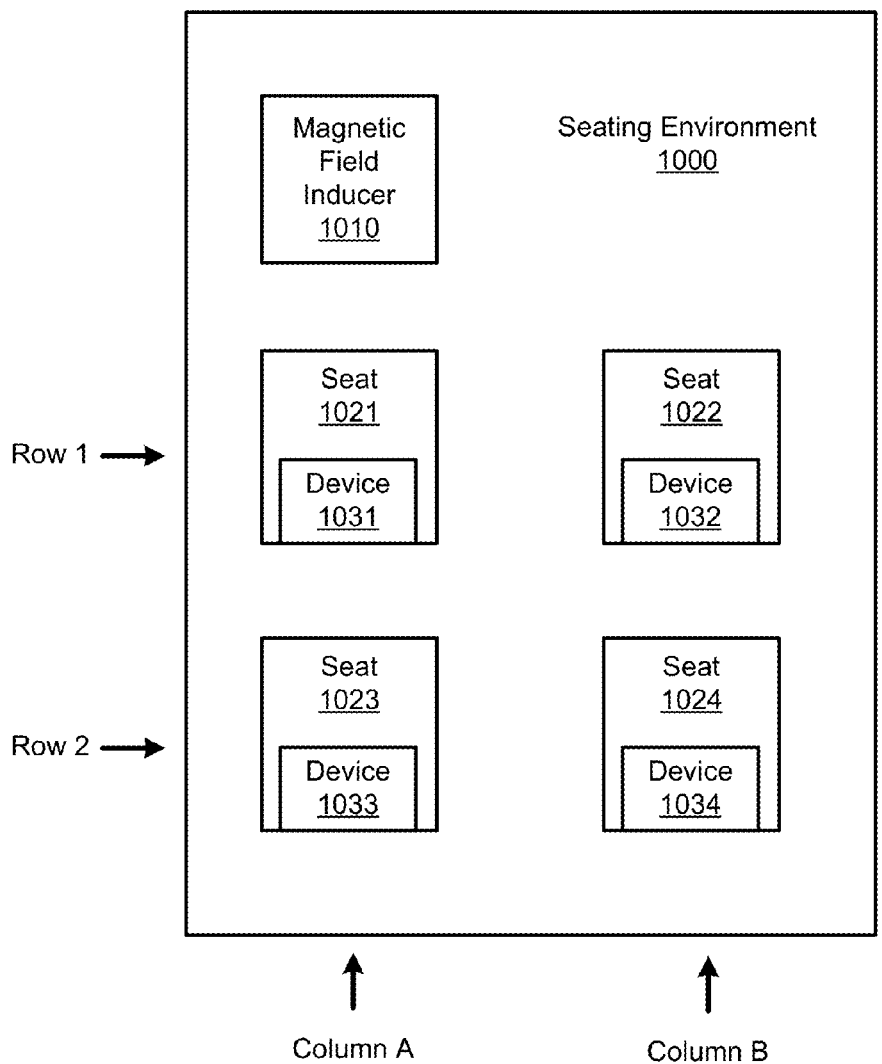
FIG. 10 shows an example seating environment with a single magnetic field inducer positioned externally to the individual seats within the seating environment.

For example, with reference to FIG. 10, a magnetic field inducer 1010 is positioned externally to individual seats 1021-1024 in a seating environment 1000. Using the magnetic field positioning techniques described above, with respect to FIG. 9, a position determination logic may determine the precise locations of a number of mobile devices 1031-1034 based at least in part on the respective direction and/or magnitude of the magnetic field (e.g., generated by magnetic field inducer 1010) that is measured by each of the mobile devices 1031-1034.

In a particular example, the seating environment 1000 may be subdivided into rows 1 and 2 and columns A and B. Based on the direction of the magnetic field detected by mobile devices 1031 and 1033, the position determination logic may determine that both of the mobile devices 1031 and 1033 are due south of the magnetic field inducer 1010 and therefore located within column A of the seating environment 1000. Moreover, because the strength of the magnetic field detected by mobile device 1031 may be greater than the strength of the magnetic field detected by mobile device 1033 (e.g., by at least a threshold amount), the position determination logic may determine that mobile device 1031 is closer in proximity to the magnetic field inducer 1010 and therefore located in row 1, whereas the mobile device 1032 is further from the magnetic field inducer 1010 and therefore located in row 2.

Based on the direction of the magnetic field detected by mobile devices 1032 and 1034, the position determination logic may determine that both of the mobile devices 1031 and 1033 are south-east of the magnetic field inducer 1010 and therefore located within column B of the seating environment. Moreover, because the strength of the magnetic field detected by mobile device 1032 may be greater than the strength of the magnetic field detected by mobile device 1034 (e.g., by at least a threshold amount), the position determination logic may determine that mobile device 1032 is closer in proximity to the magnetic field inducer 1010 and therefore located in row 1, whereas mobile device 1032 is further from the magnetic field inducer 1010 and therefore located in row 2.

Once the locations of the mobile devices 1031-1034 are known, each mobile device may then be paired or otherwise associated with the corresponding seat at that location. For example, since mobile device 1031 and seat 1021 are both located in row 1 column A of the seating environment 1000, mobile device 1031 may be associated with seat 1021. Since mobile device 1032 and seat 1022 are both located in row 1 column B of the seating environment 1000, mobile device 1032 may be associated with seat 1022. Since mobile device 1033 and seat 1023 are both located in row 2 column A of the seating environment 1000, mobile device 1033 may be associated with seat 1023. Since mobile device 1034 and seat 1024 are both located in row 2 column B of the seating environment 1000, mobile device 1034 may be associated with seat 1024.

Methodology

Figure 11:
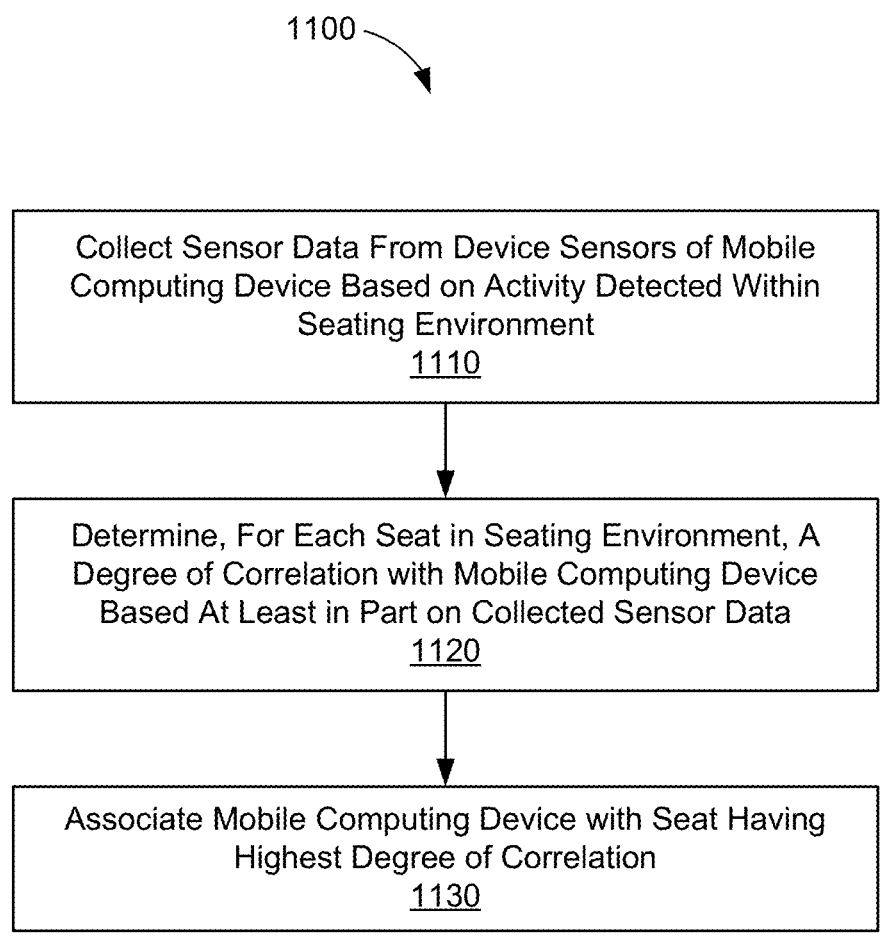
FIG. 11 shows a flowchart depicting an example seat association operation in accordance with example implementations.

FIG. 11 shows a flowchart depicting an example seat association operation 1100 in accordance with example implementations. With reference for example to FIGS. 1A-1G, the example operation 1100 may be performed by the local hub 110 and/or one or more of the mobile computing devices 131-132 to determine a seat association for each mobile computing device in the seating environment 101. For purposes of discussion, the example operation 1100 is described below in the context of being performed by local hub 110.

The local hub 110 collects sensor data from one or more device sensors of a mobile computing device based on activity detected within a seating environment (1110). For example, with reference to FIG. 1A, the mobile computing device 131 may include one or more sensors 133 (e.g., accelerometer, gyroscope, magnetometer, etc.) that may be used to detect activity by the mobile computing device 131 and/or in the surrounding environment (e.g., seating environment 101). The mobile computing device 131 may transmit sensor data 102, collected from the device sensor 133, to the local hub 110. The sensor data 102 may include, for example, accelerometer data indicating a direction and/or magnitude of acceleration of the mobile computing device 131, magnetometer data indication a direction and/or magnitude of a magnetic field in the seating environment 101, and/or data from any other sensors provided with the mobile computing device 131.

The local hub 110 may then determine, for each seat in the seating environment, a degree of correlation with the mobile computing device based at least in part on the collected sensor data (1120). For example, the local hub 110 may include seat association logic 112 to compare the sensor data 102 collected from mobile computing device 131 with other data and/or known information regarding the seating environment 101 to determine the degree of correlation of the mobile computing device 131 to each of the seats 121-124. In some aspects, the seat association logic 112 may determine the degree of correlation based on accelerometer data of the mobile computing device 131 (e.g., as described above with respect to FIGS. 1B-1D). In other aspects, the seat association logic 112 may determine the degree of correlation based on magnetometer data of the mobile computing device 131 (e.g., as described above with respect to FIGS. 1E-1G).

Finally, the local hub 110 may associate the mobile computing device with the seat having the highest degree of correlation (1130). In the example of FIG. 1A, the seat association logic 112 may determine that, among the seats 121-124 in the seating environment 101, mobile computing device 131 has the highest correlation with seat 121. Accordingly, the seat association logic 112 may associate the mobile computing device 131 with seat 121 (e.g., a user of the mobile computing device 131 is determined to be seated in seat 121). In some aspects, upon associating the mobile computing device 131 with seat 121, the local hub 110 may further transmit configuration data 104 and 106 to seat 121 and mobile computing device 131, respectively, to adjust one or more configurations or settings of the seating environment 101 (e.g., based on preferences of the user of the mobile computing device 131).

Figure 12:
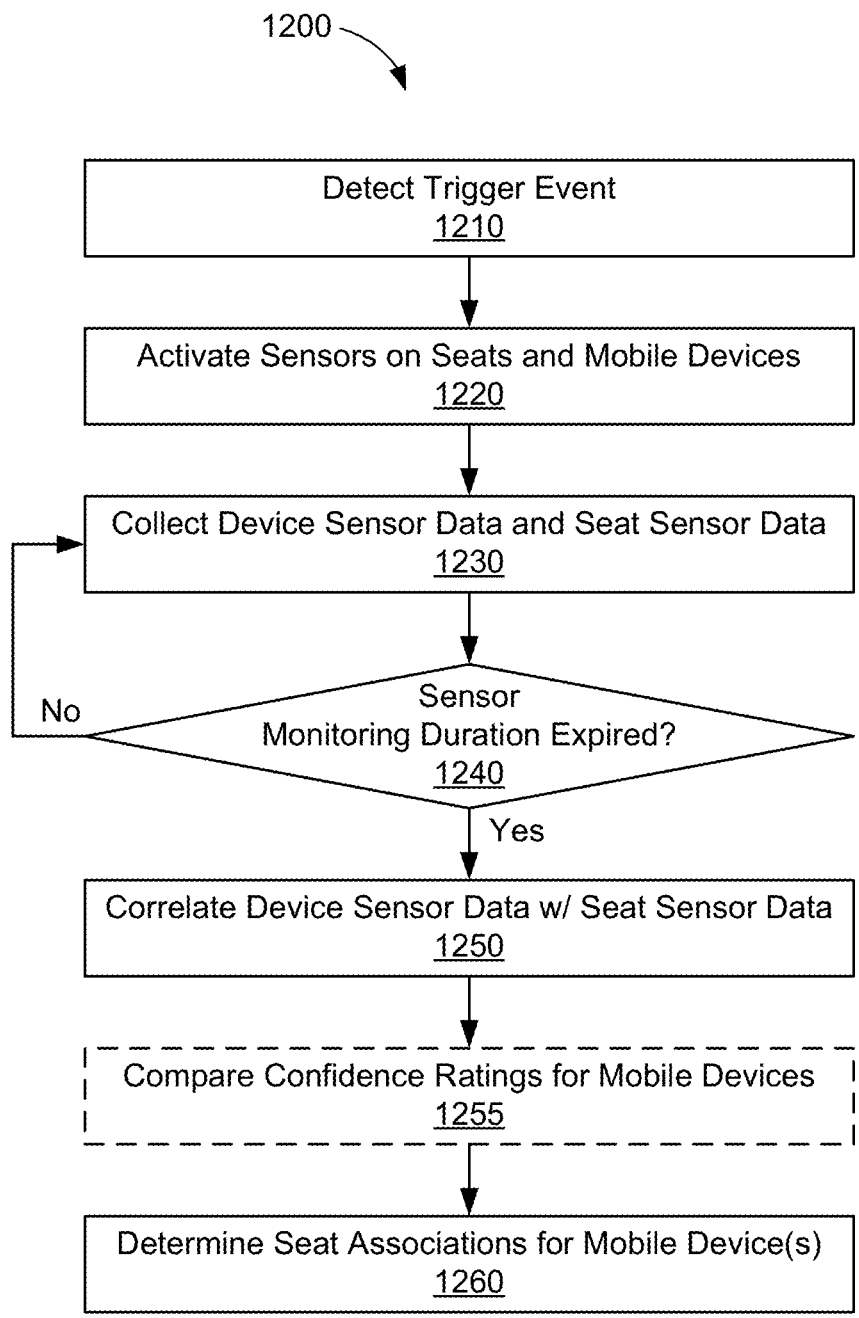
FIG. 12 shows a flowchart depicting an example operation for associating a mobile computing device with a particular seat in a seating environment based on sensor data correlations between the mobile device and respective seats in the seating environment.

FIG. 12 shows a flowchart depicting an example operation 1200 for associating a mobile computing device with a particular seat in a seating environment based on sensor data correlations between the mobile device and respective seats in the seating environment. With reference for example to FIGS. 1B-1D, the example operation 1200 may be performed by the local hub 110 and/or one or more of the mobile computing devices 131-132 (e.g., depending on implementation) to determine a seat association for each mobile computing device in the seating environment 101. For purposes of discussion, the example operation 1200 is described below in the context of being performed by local hub 110.

The local hub 110 first detects a trigger event in the seating environment (1210), and subsequently activates sensors on the seats and mobile computing devices within the seating environment (1220). For example, the trigger event may correspond to a user entering the seating environment 101 (e.g., as detected by the opening and/or closing of a vehicle door, the buckling of a seatbelt, and/or a motion sensor or camera positioned within the vehicle's cabin). In response to the trigger event, the local hub 110 may broadcast a trigger signal to each of the seat sensors 141-144 (e.g., of seats 121-144, respectively) and device sensors 133-134 (e.g., of mobile computing devices 131-132, respectively), causing the respective sensors to begin sensing activity (e.g., movement) within the seating environment 101

The trigger signal may indicate the start of a sensor monitoring duration during which the local hub 110 collects device sensor data and seat sensor data from respective device sensors and seat sensors within the seating environment (1230). For example, each of the seat sensors 141-144 may send seat sensor data (e.g., accelerometer data), as respective sensor output profiles 171-174, to the local hub 110 based on movement or activity detected with respect to a corresponding seat in the seating environment 101. Each of the device sensors 133-134 may send device sensor data (e.g., accelerometer data), as respective device sensor profiles 161-162, to the local hub 110 based on movement or activity detected with respect to a corresponding mobile computing device. As long as the sensor monitoring duration has not expired (as tested at 1240), the local hub 110 may continue collecting sensor data from seat sensors 141-144 and device sensors 133-134 (1230).

Once the sensor monitoring during has expired (as tested at 1240), the local hub 110 may correlate the device sensor data with the seat sensor data to determine respective degrees of correlation between the mobile computing devices and seats in the seating environment (1250). In some aspects, the local hub 110 may include sensor correlation logic 150 to compare each of the device sensor profiles 161 and 162 against the set of sensor output profiles 171-174 to determine respective degrees of similarity among the sensor profiles. For example, the sensor correlation logic 150 may generate a set of correlation results indicating, for each of the mobile computing devices 131 and 132, a respective degree of correlation of that device to each of the seats 121-124 in the seating environment 101.

In some implementations, the sensor correlation logic 150 may generate a separate set of correlation results for each of the mobile computing devices 131-132. Thus, in some aspects, the sensor correlation logic 150 may further compare the confidence ratings for different mobile computing devices (1255). For example, in some instances, the correlation results for one mobile computing device may conflict with the correlation results with another mobile computing device (e.g., multiple devices may be strongly correlated with the same seat). In some aspects, the sensor correlation logic 150 may resolve such conflicts by allowing one set of correlation results to override or take precedence over the other set of correlation results, at least with respect to a particular seat, based on the actual degrees of correlation for that seat (e.g., confidence rating).

Finally, the local hub 110 may determine a seat association for each of the mobile computing devices in the seating environment (1260). For example, based on the correlation results, the sensor correlation logic 150 may associate each of the mobile computing devices 131-132 to the seat with the highest degree of correlation. In the example of FIG. 1B, the sensor correlation logic 150 may determine that, among the seats 121-124 in the seating environment 101, mobile computing device 131 has the highest correlation with seat 121 and mobile computing device 132 has the highest correlation with seat 122. Accordingly, the sensor correlation logic 150 may associate the mobile computing devices 131 and 132 with seats 121 and 122, respectively.

Figure 13:
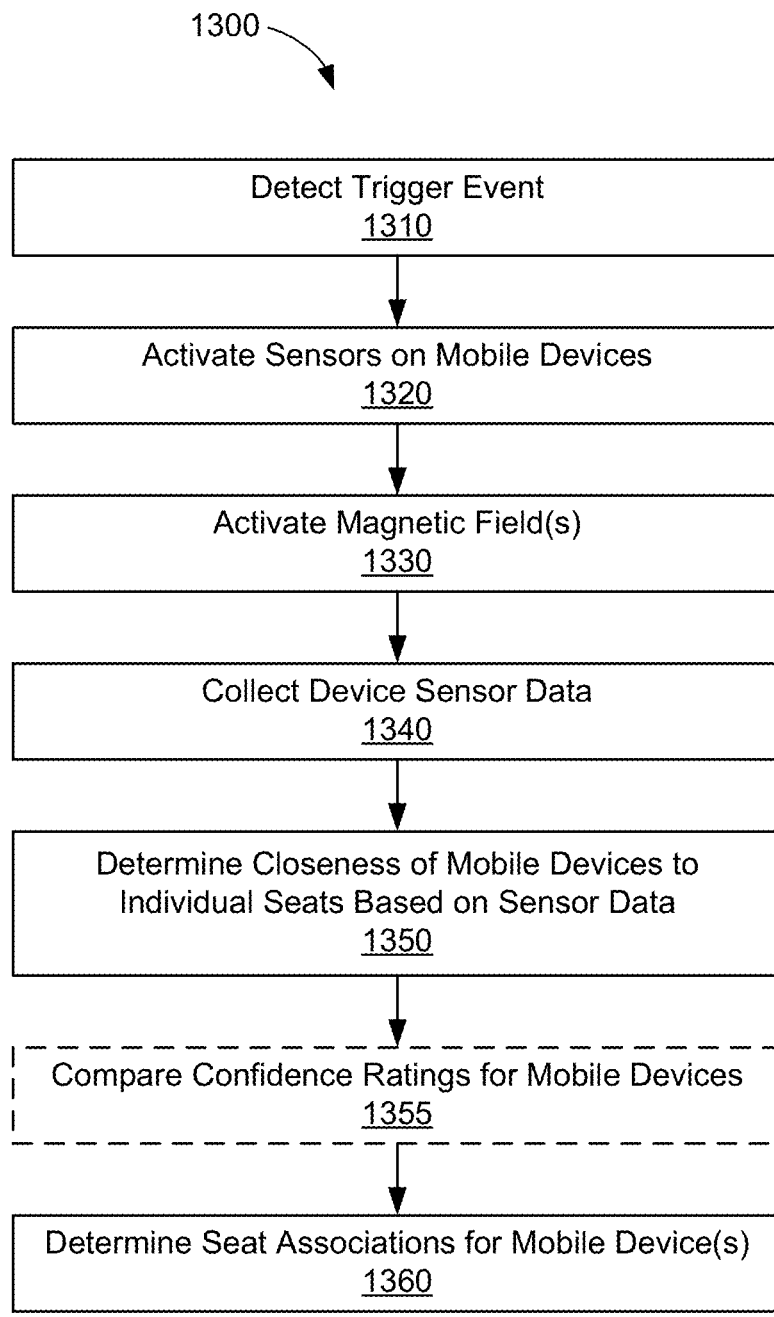
FIG. 13 shows a flowchart depicting an example operation for associating a mobile computing device with a particular seat in a seating environment based on sensor data collected with respect to a magnetic field within the seating environment.

FIG. 13 shows a flowchart depicting an example operation 1300 for associating a mobile computing device with a particular seat in a seating environment based on sensor data collected with respect to a magnetic field within the seating environment. With reference for example to FIGS. 1E-1G, the example operation 1300 may be performed by the local hub 110 and/or one or more of the mobile computing devices 131-132 (e.g., depending on implementation) to determine a seat association for each mobile computing device in the seating environment 101. For purposes of discussion, the example operation 1300 is described below in the context of being performed by local hub 110.

The local hub 110 first detects a trigger event in the seating environment (1310), and subsequently activates sensors on the mobile computing devices within the seating environment (1320). For example, the trigger event may correspond to a user entering the seating environment 101 (e.g., as detected by the opening and/or closing of a vehicle door, the buckling of a seatbelt, and/or a motion sensor or camera positioned within the vehicle's cabin). In response to the trigger event, the local hub 110 may broadcast a trigger signal to the device sensors 133-134 of respective mobile computing devices 131-132, causing each of the device sensors 133-134 to begin sensing activity (e.g., magnetic fields) within the seating environment 101.

Furthermore, the local hub 110 may activate or generate one or more magnetic fields within the seating environment (1330). For example, the local hub 110 may instruct the magnetic resources 182-184 to induce or otherwise produce the magnetic fields 181. In some aspects, the local hub 110 may activate each of the magnetic resources 182-184 in a particular sequence so that only one of the magnetic resources 182-184 produce its magnetic field 181 at any given instance in time.

The local hub 110 then collects device sensor data from respective device sensors within the seating environment (1340). For example, each of the device sensors 133-134 may send device sensor data (e.g., magnetometer data), as respective device sensor profiles 191-192, to the local hub based on the magnetic field 181 as detected by a corresponding mobile computing device. More specifically, the device sensor data may indicate at least a direction and strength of the magnetic field 181 at the location of the detecting device.

The local hub 110 determines a closeness of the mobile computing devices to individual seats in the seating environment based on the collected sensor data (1350). In some aspects, the local hub 110 may include position determination logic 190 to determine a relative position of each of the mobile computing devices 131-132 within the seating environment 101. For example, the position determination logic 190 may determine a relative proximity of each mobile computing device 131-132 to each of the magnetic resources 182-184 based on the strength and/or direction of the magnetic fields 181 detected by that mobile computing device. Then, based on known locations of the magnetic resources 182-184 (e.g., in relation to the seats 121-124) within the seating environment 101, the position determination logic 190 may determine a closeness of each of the seats 121-124 to each of the mobile computing devices 131-132. For example, the position determination logic 190 may generate a set of correlation results indicating, for each of the mobile computing devices 131 and 132, a respective degree of correlation (e.g., closeness) of that device to each of the seats 121-124 in the seating environment 101.

In some implementations, the position determination logic 190 may generate a separate set of correlation results for each of the mobile computing devices 131-132. Thus, in some aspects, the position determination logic 190 may further compare the confidence ratings for different mobile computing devices (1355). For example, in some instances, the correlation results for one mobile computing device may conflict with the correlation results with another mobile computing device (e.g., multiple devices may be strongly correlated with the same seat). In some aspects, the position determination logic 190 may resolve such conflicts by allowing one set of correlation results to override or take precedence over the other set of correlation results, at least with respect to a particular seat, based on the actual degrees of correlation for that seat (e.g., confidence rating).

Finally, the local hub 110 may determine a seat association for each of the mobile computing devices in the seating environment (1360). For example, based on the correlation results, the position determination logic 190 may associate each of the mobile computing devices 131-132 to the seat with the highest degree of correlation (e.g., closeness). In the example of FIG. 1E, the position determination logic 190 may determine that, among the seats 121-124 in the seating environment 101, mobile computing device 131 is closest to seat 1 and mobile computing device 132 is closest to seat 2. Accordingly, the position determination logic 190 may associate the mobile computing devices 131 and 132 with seats 121 and 122, respectively.

Figure 14:
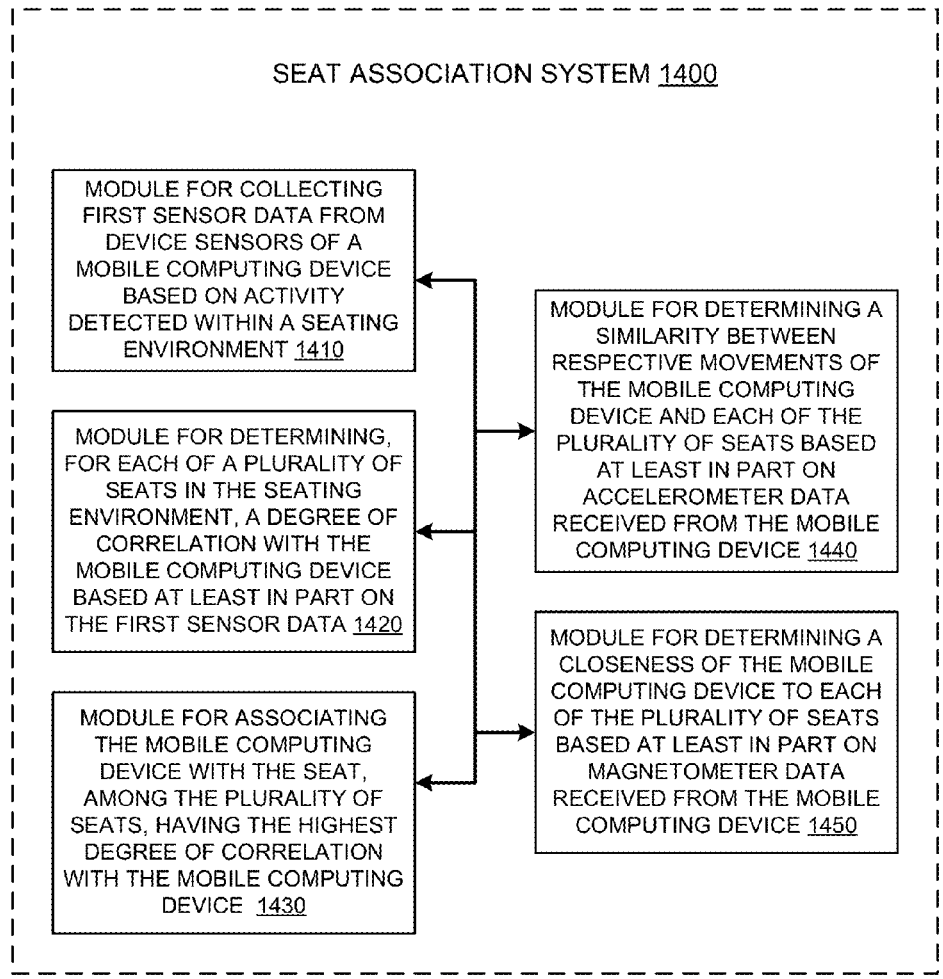
FIG. 14 shows an example seat association system represented as a series of interrelated functional modules.

FIG. 14 shows an example seat association system 1400 represented as a series of interrelated functional modules. A module 1410 for collecting first sensor data from device sensors of a mobile computing device based on activity detected within a seating environment may correspond at least in some aspects to, for example, a processor as discussed herein (e.g., processors 220 or 320) and/to a local hub (e.g., local hub 110) or a mobile computing device (e.g., mobile computing devices 131 or 132) as discussed herein. A module 1420 for determining, for each of a plurality of seats in the seating environment, a degree of correlation with the mobile computing device based at least in part on the first sensor data may correspond at least in some aspects to, for example, a processor as discussed herein (e.g., processors 220 or 320) and/to seat association logic as discussed herein (e.g., seat association logic 112, sensor correlation logic 150, or position determination logic 190). A module 1430 for associating the mobile computing device with the seat, among the plurality of seats, having the highest degree of correlation with the mobile computing device may correspond at least in some aspects to, for example, a processor as discussed herein (e.g., processors 220 or 320) and/to seat association logic as discussed herein (e.g., seat association logic 112, sensor correlation logic 150, or position determination logic 190).

A module 1440 for determining a similarity between respective movements of the mobile computing device and each of the plurality of seats based at least in part on accelerometer data received from the mobile computing device may correspond at least in some aspects to, for example, a processor as discussed herein (e.g., processors 220 or 320) and/to seat association logic as discussed herein (e.g., seat association logic 112, sensor correlation logic 150, or position determination logic 190). A module 1450 for determining a closeness of the mobile computing device to each of the plurality of seats based at least in part on magnetometer data received from the mobile computing device may correspond at least in some aspects to, for example, a processor as discussed herein (e.g., processors 220 or 320) and/to seat association logic as discussed herein (e.g., seat association logic 112, sensor correlation logic 150, or position determination logic 190).

The functionality of the modules of FIG. 14 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 14, as well as other components and functions described herein, may be implemented using any suitable means. Such means also may be implemented, at least in part, using corresponding structure as taught herein. For example, the components described above in conjunction with the "module for" components of FIG. 14 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method for associating a mobile computing device with a particular seat in a seating environment, the method comprising:
    collecting first sensor data from device sensors of a first mobile computing device based on activity detected within the seating environment;
    determining, for each of a plurality of seats in the seating environment, a degree of correlation with the first mobile computing device based at least in part on the first sensor data; and
    associating the first mobile computing device with the seat, among the plurality of seats, having the highest degree of correlation with the first mobile computing device.

2. The method of claim 1, wherein the determining comprises:
    receiving second sensor data from each of a plurality of seat sensors; and
    comparing, for each of the plurality of seats, the first sensor data with the second sensor data received from a corresponding one of the plurality of seat sensors.

3. The method of claim 2, wherein the first sensor data includes accelerometer data based on a movement of the first mobile computing device, and each of the second sensor data includes accelerometer data based on a movement of a corresponding one of the plurality of seats.

4. The method of claim 3, wherein the determining further comprises:
    determining a similarity between respective movements of the first mobile computing device and each of the plurality of seats.

5. The method of claim 1, wherein the first sensor data includes magnetometer data based on a magnetic field in the seating environment.

6. The method of claim 5, wherein the magnetometer data indicates at least a direction and strength of the magnetic field at a location of the first mobile computing device.

7. The method of claim 5, wherein the determining comprises:
    determining a relative proximity of the first mobile computing device to a source of the magnetic field based at least in part on the magnetometer data;
    identifying a location of the source relative to each of the plurality of seats; and
    determining a closeness of the first mobile computing device to each of the plurality of seats based at least in part on the location of the source and the relative proximity of the first mobile computing device to the source.

8. The method of claim 1, further comprising:
    collecting third sensor data from device sensors of a second mobile computing device in the seating environment.

9. The method of claim 8, wherein the determining comprises:
    comparing the first sensor data with the third sensor data; and
    determining the degree of correlation of the first mobile computing device to each of the plurality of seats in the seating environment based at least in part on a result of the comparison.

10. A seat association system, comprising:
    one or more processors; and
    a memory storing instructions that, when executed by the one or more processors, cause the system to:
        collect first sensor data from device sensors of a first mobile computing device based on activity detected within a seating environment;
        determine, for each of a plurality of seats in the seating environment, a degree of correlation with the first mobile computing device based at least in part on the first sensor data; and
        associate the first mobile computing device with the seat, among the plurality of seats, having the highest degree of correlation with the first mobile computing device.

11. The system of claim 10, wherein execution of the instructions to determine the degree of correlation causes the system to:
    receive second sensor data from each of a plurality of seat sensors; and
    compare, for each of the plurality of seats, the first sensor data with the second sensor data received from a corresponding one of the plurality of seat sensors.

12. The system of claim 11, wherein the first sensor data includes accelerometer data based on a movement of the first mobile computing device, and each of the second sensor data includes accelerometer data based on a movement of a corresponding one of the plurality of seats.

13. The system of claim 12, wherein execution of the instructions to determine the degree of correlation further causes the system to:
    determine a similarity between respective movements of the first mobile computing device and each of the plurality of seats.

14. The system of claim 10, wherein the first sensor data includes magnetometer data based on a magnetic field in the seating environment.

15. The system of claim 14, wherein the magnetometer data indicates at least a direction and strength of the magnetic field at a location of the first mobile computing device.

16. The system of claim 14, wherein execution of the instructions to determine the degree of correlation causes the system to:

determine a relative proximity of the first mobile computing device to a source of the magnetic field based at least in part on the magnetometer data;

identify a location of the source relative to each of the plurality of seats; and determine a closeness of the first mobile computing device to each of the plurality of seats based at least in part on the location of the source and the relative proximity of the first mobile computing device to the source.

17. The system of claim 10, wherein execution of the instructions further causes the system to:

collect third sensor data from device sensors of a second mobile computing device in the seating environment.

18. The system of claim 17, wherein execution of the instructions to determine the degree of correlation causes the system to:

compare the first sensor data with the third sensor data; and determine the degree of correlation of the first mobile computing device to each of the plurality of seats in the seating environment based at least in part on a result of the comparison.

19. A seat association system, comprising:

means for collecting first sensor data from device sensors of a first mobile computing device based on activity detected within a seating environment;

means for determining, for each of a plurality of seats in the seating environment, a degree of correlation with the first mobile computing device based at least in part on the first sensor data; and means for associating the first mobile computing device with the seat, among the plurality of seats, having the highest degree of correlation with the first mobile computing device.

20. The system of claim 19, wherein the means for determining the degree of correlation is to:

receive second sensor data from each of a plurality of seat sensors; and compare, for each of the plurality of seats, the first sensor data with the second sensor data received from a corresponding one of the plurality of seat sensors.

21. The system of claim 20, wherein the first sensor data includes accelerometer data based on a movement of the first mobile computing device, and each of the second sensor data includes accelerometer data based on a movement of a corresponding one of the plurality of seats.

22. The system of claim 21, wherein the means for determining the degree of correlation is to further:

determine a similarity between respective movements of the first mobile computing device and each of the plurality of seats.

23. The system of claim 19, wherein the first sensor data includes magnetometer data based on a magnetic field in the seating environment.

24. The system of claim 23, wherein the means for determining the degree of correlation is to:

determine a relative proximity of the first mobile computing device to a source of the magnetic field based at least in part on the magnetometer data;

identify a location of the source relative to each of the plurality of seats; and determine a closeness of the first mobile computing device to each of the plurality of seats based at least in part on the location of the source and the relative proximity of the first mobile computing device to the source.

25. A non-transitory computer-readable storage medium containing program instructions that, when executed by one or more processors of a seat association system, causes the system to:

collect first sensor data from device sensors of a first mobile computing device based on activity detected within a seating environment;

determine, for each of a plurality of seats in the seating environment, a degree of correlation with the first mobile computing device based at least in part on the first sensor data; and associate the first mobile computing device with the seat, among the plurality of seats, having the highest degree of correlation with the first mobile computing device.

26. The non-transitory computer-readable storage medium of claim 25, wherein execution of the instructions to determine the degree of correlation causes the system to:

receive second sensor data from each of a plurality of seat sensors; and compare, for each of the plurality of seats, the first sensor data with the second sensor data received from a corresponding one of the plurality of seat sensors.

27. The non-transitory computer-readable storage medium of claim 26, wherein the first sensor data includes accelerometer data based on a movement of the first mobile computing device, and each of the second sensor data includes accelerometer data based on a movement of a corresponding one of the plurality of seats.

28. The non-transitory computer-readable storage medium of claim 27, wherein execution of the instructions to determine the degree of correlation further causes the system to:

determine a similarity between respective movements of the mobile computing device and each of the plurality of seats.

29. The non-transitory computer-readable storage medium of claim 25, wherein the first sensor data includes magnetometer data based on a magnetic field in the seating environment.

30. The non-transitory computer-readable storage medium of claim 29, wherein execution of the instructions to determine the degree of correlation causes the system to:

determine a relative proximity of the mobile computing device to a source of the magnetic field based at least in part on the magnetometer data;

identify a location of the source relative to each of the plurality of seats; and determine a closeness of the mobile computing device to each of the plurality of seats based at least in part on the location of the source and the relative proximity of the mobile computing device to the source.

* * * * *